(12) United States Patent
DesRoches et al.

(10) Patent No.: US 9,167,894 B2
(45) Date of Patent: *Oct. 27, 2015

(54) WORKSTATION HAVING AUTOMATED AND POWERED HEIGHT, DEPTH AND ROTATIONAL ADJUSTERS

(71) Applicant: SPARX SMART PODS INC., Dieppe (CA)

(72) Inventors: Léon DesRoches, Dieppe (CA); Nancy Lee Black, Moncton (CA)

(73) Assignee: SPARX SMART PODS INC., Dieppe, New Brunswick (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,247

(22) Filed: Jun. 10, 2013

(65) Prior Publication Data

US 2014/0208986 A1    Jul. 31, 2014

Related U.S. Application Data

(63) Continuation-in-part of application No. 13/750,308, filed on Jan. 25, 2013, now Pat. No. 8,991,320.

(51) Int. Cl.
*A47B 37/00* (2006.01)
*A47B 21/00* (2006.01)
(Continued)

(52) U.S. Cl.
CPC . *A47B 21/00* (2013.01); *A47B 9/20* (2013.01); *A47B 13/081* (2013.01); *A47B 2083/025* (2013.01); *A47B 2200/0072* (2013.01)

(58) Field of Classification Search
CPC .... A47B 21/00; A47B 21/02; A47B 21/0314; A47B 21/04; A47B 83/00; A47B 83/001; A47B 83/04

USPC .............. 108/20, 21, 50.01, 50.02, 147, 138, 108/139; 297/217.3, 170, 172, 135, 138; 454/228; 400/682, 681; 361/379.22, 361/679.6, 79.22, 679.66; 312/223.6, 312/223.1, 195

See application file for complete search history.

(56) References Cited

U.S. PATENT DOCUMENTS

| | | | |
|---|---|---|---|
| 4,134,614 A | | 1/1979 | Fielding, Sr. |
| 4,762,072 A | * | 8/1988 | Boundy et al. ............. 108/50.02 |

(Continued)

FOREIGN PATENT DOCUMENTS

| | | |
|---|---|---|
| CN | 201278932 Y | 7/2009 |
| EP | 1364596 A1 | 11/2003 |

(Continued)

OTHER PUBLICATIONS

Herman Miller, Envelop Desk, "http://www.hermanmiller.com/content/dam/hermanmiller/documents/product_literature/brochures/Envelop_Desk_brochure.pdf", undated [Accessed: Aug. 13, 2013].

*Primary Examiner* — Jose V Chen
(74) *Attorney, Agent, or Firm* — Bereskin & Parr LLP/S.E.N.C.R.L., s.r.l.

(57) ABSTRACT

A workstation is disclosed including a tabletop, a frame, a support coupled to the tabletop and the frame for supporting the tabletop vertically above the frame, and a powered rotator coupled to the frame. The powered rotator may be configured to move the support and the tabletop horizontally along an arcuate path with respect to a user position. The user position and a center of curvature of the arcuate path may each be disposed away from a forward edge of the tabletop. A method of moving a tabletop of a workstation is also disclosed.

20 Claims, 32 Drawing Sheets

(51) Int. Cl.
*A47B 21/02* (2006.01)
*A47B 9/20* (2006.01)
*A47B 13/08* (2006.01)
*A47B 83/02* (2006.01)

(56) References Cited

U.S. PATENT DOCUMENTS

| | | | |
|---|---|---|---|
| 4,852,500 A * | 8/1989 | Ryburg et al. | 108/105 |
| 4,880,270 A | 11/1989 | Cooper | |
| 5,323,695 A | 6/1994 | Borgman et al. | |
| 5,909,934 A | 6/1999 | McGraw | |
| 5,988,076 A * | 11/1999 | Vander Park | 108/50.02 |
| 6,102,476 A | 8/2000 | May et al. | |
| 6,248,014 B1 | 6/2001 | Collier | |
| 6,269,753 B1 | 8/2001 | Roddan | |
| 6,270,157 B1 | 8/2001 | Kapushinski | |
| 6,296,408 B1 | 10/2001 | Larkin et al. | |
| 6,354,044 B1 | 3/2002 | Lagace, Jr. | |
| 6,712,008 B1 | 3/2004 | Habenicht et al. | |
| 6,726,276 B1 | 4/2004 | Tholkes et al. | |
| 6,817,684 B2 * | 11/2004 | Cattaneo | 312/223.6 |
| 6,848,369 B1 * | 2/2005 | King et al. | 108/50.02 |
| 6,960,098 B1 * | 11/2005 | Tseng | 108/50.02 |
| 7,100,517 B1 | 9/2006 | Godwin | |
| 7,134,719 B2 | 11/2006 | Moglin et al. | |
| 7,620,667 B2 | 11/2009 | Rollin et al. | |
| 7,640,866 B1 * | 1/2010 | Schermerhorn | 108/50.02 |
| 7,677,678 B2 | 3/2010 | Mosel et al. | |
| 7,690,317 B2 * | 4/2010 | Beck et al. | 108/50.01 |
| 7,823,973 B2 | 11/2010 | Dragusin | |
| 7,887,130 B1 | 2/2011 | Zvolena | |
| 8,051,782 B2 | 11/2011 | Nethken et al. | |
| 8,141,949 B2 | 3/2012 | Baru | |
| 8,174,379 B2 * | 5/2012 | Black | 108/50.02 |
| 8,186,281 B2 * | 5/2012 | Bastian et al. | 108/50.02 |
| 8,678,936 B2 | 3/2014 | Lesley et al. | |
| 2001/0020810 A1 | 9/2001 | Kennedy | |
| 2006/0124036 A1 | 6/2006 | Xu et al. | |
| 2006/0241520 A1 | 10/2006 | Robertson | |
| 2008/0245279 A1 | 10/2008 | Pan | |
| 2009/0133609 A1 | 5/2009 | Nethken et al. | |
| 2009/0165680 A1 * | 7/2009 | Bakker et al. | 108/50.02 |
| 2010/0201165 A1 | 8/2010 | Dankovich | |
| 2012/0031310 A1 * | 2/2012 | Jedrysik et al. | 108/50.01 |
| 2012/0085267 A1 | 4/2012 | Kenny | |
| 2013/0106146 A1 | 5/2013 | Leclaire | |
| 2013/0331993 A1 | 12/2013 | Detsch et al. | |
| 2014/0096706 A1 | 4/2014 | Labrosse, J. et al. | |

FOREIGN PATENT DOCUMENTS

| | | |
|---|---|---|
| WO | 2009064246 A1 | 5/2009 |
| WO | 2010127425 A1 | 11/2010 |

* cited by examiner

WORKSTATION HAVING AUTOMATED AND POWERED HEIGHT, DEPTH AND ROTATIONAL ADJUSTERS

CROSS-REFERENCE TO RELATED APPLICATIONS

This application claims the benefit of U.S. patent application Ser. No. 13/750,308 entitled "WORKSTATION HAVING AUTOMATED AND POWERED HEIGHT, DEPTH AND ROTATIONAL ADJUSTERS" which was filed Jan. 25, 2013. The entirety of the aforementioned application is herein incorporated by reference.

FIELD

This application relates to the field of office workstations.

INTRODUCTION

Seated work in a climate controlled environment has been viewed as preferable to physically intense work. Work stations tend to be designed to minimize movement and conserve energy. However, sedentary work environments may contribute to increase rates of obesity, diabetes, cardiovascular disease, high cholesterol, and musculoskeletal injuries such as carpal tunnel syndrome and degenerative disks. Each of these maladies can lead to decreased productivity, lower employee morale and increased health care costs.

Much of the workforce in developed countries works seated at a computer. However, sitting burns fewer calories than standing which may contribute to increased rates of obesity, mortality, and in particular cardiovascular disease mortality. The World Health Organization has associated increased obesity with rising rates of type II diabetes, hypertension, stroke, sleep apnea, cholelithiasis, degenerative arthritis and certain cancers (e.g. colon cancer).

While the etiology of obesity can be complex, it may generally occur when daily energy intake exceeds total daily energy expenditure (TDEE). Human TDEE may be subdivided into three components: basal metabolic rate (BMR), thermic effects of food (TEF) and activity thermogenesis (AT). BMR is the energy required for core body function during rest, which may account for approximately 60% of a sedentary individual's daily energy expenditure. TEF is the energy required during digestion, absorption and fuel storage after a meal, which may account for approximately 10% of a sedentary individual's daily energy expenditure. AT can be further subdivided into exercise AT (i.e. bodily exertion for the sake of developing and maintaining physical fitness), and non-exercise AT (NEAT) (i.e. energy expenditure that occurs while performing routine daily activities such as, for example, climbing stairs at home and walking in the office). Increasing an individual's AT may help reduce the risk of obesity and related maladies.

Some studies suggest that people who are predominantly seated while working (e.g. bus drivers and telephone operators), may have twice the chance of developing cardiovascular diseases (CVD) as compared to people who are able to stand throughout the day such as bus conductors or mail carriers. In fact, it has been reported that an individual's risk of suffering from metabolic syndrome as well as uncontrolled metabolic risk factors (e.g. CVD, types II diabetes, HBP, cholesterol, plasma glucose, plasma triglycerides, central adiposity and waist girth) may be directly related to the time the individual has spent sitting and inversely related to the individual's NEAT level.

Standing and transitioning from sitting to standing regularly may provide significant health benefits. Some studies have found that increases in muscle activity in the quadriceps during standing, as well the transition from sitting to standing, may affect specific cellular signals and regulate health risk factors, possibly better than intense exercise activities like running 35 miles/week or taking hour-long brisk walks 5 days/week. Workers who stand on a regular basis (e.g. a shop assistant) may expend up to 1400 kcal/day without engaging in any strenuous physical activity. In contrast, workers who are chair-bound may expend as little as 300 kcal/day.

Lower back pain is a common problem among seated workers. Some studies suggest that prolonged static sitting and reduced lumbar lordosis may be two significant risk factors associated with occupational lower back pain. It has been reported that workers with jobs that require prolonged sitting may be 3.2 times more likely to develop lower back pain within the first year of employment.

Some manufacturers have introduced walking workstations and cycling workstations to address the problems of sedentary workplaces. However, some studies suggest that these workstations may contribute to reduced productivity relative to standing or seated workstations.

SUMMARY

According to a first embodiment, there is a workstation including a tabletop, a frame, a support coupled to the tabletop and the frame for supporting the tabletop vertically above the frame, and a powered rotator coupled to the frame. The powered rotator may be configured to move the support and the tabletop horizontally along an arcuate path with respect to a user position. The user position and a center of curvature of the arcuate path may each be disposed away from a forward edge of the tabletop.

In at least one embodiment, the workstation further includes a cable management system. The cable management system may provide a cable pathway that tracks the movement of the powered rotator and the arcuate path.

In at least one embodiment, the cable management system further includes a first cable conduit extending between a first position on the frame, and a second position proximate the powered rotator. A path length of the first cable conduit may be at least a distance between the first position and a third position along the arcuate path that is farthest from the first position.

In at least one embodiment, the first cable conduit may be flexible and configured to form an auxiliary loop when the powered rotator is at a fourth position along the arcuate path that is closer to the first position than the distance between the first position and the third position.

In at least one embodiment the support may include a powered height adjuster for adjusting a vertical height of the tabletop. The cable management system may further include a second cable conduit coupled to the first cable conduit at the second position, and the tabletop. A path length of the second cable conduit may be at least a distance between the second position and the tabletop when the powered height adjuster adjusts the vertical height of the tabletop to a maximum height.

In at least one embodiment, the second cable conduit may be flexible and configured to form an auxiliary loop when the powered height adjuster adjusts the vertical height of the tabletop to a second height less than the maximum height.

In at least one embodiment, at least one of the first cable conduit and the second cable conduit may include a chain of pivotally connected conduit links.

In at least one embodiment, the frame may include a guide rail defining the arcuate path, and the powered rotator may be coupled to the guide rail and configured to move along the guide rail.

In at least one embodiment, the powered rotator may be coupled to the guide rail by a plurality of rollers.

In at least one embodiment, the plurality of rollers may make rolling contact with a plurality of faces of the guide rail.

In at least one embodiment, the powered rotator may further include a drive assembly, the frame may further include a drive belt extending through the drive assembly, and the drive assembly may act upon the drive belt to move the powered rotator along the guide rail.

In at least one embodiment, the powered rotator may further include a gear that engages the drive belt, and a motor drivingly coupled to the gear. When the motor rotates the gear, the gear may apply a tensile force to the drive belt thereby urging the powered rotator to move along the guide rail.

In at least one embodiment, the drive belt may have a surface profile that meshes with teeth of the gear.

In at least one embodiment, the powered rotator may further include first and second guide rollers, and the drive belt may extend between the first guide roller and the gear, and may extend between the second guide roller and the gear.

In at least one embodiment, the support may include a powered height adjuster for adjusting a vertical height of the tabletop.

In at least one embodiment, the workstation may further include a powered depth adjuster for adjusting a distance between the forward edge of the tabletop and the user position.

In at least one embodiment, the powered depth adjuster may be operable to move the tabletop horizontally in a direction generally perpendicular to the arcuate path.

In at least one embodiment, the powered rotator, the powered height adjuster and the powered depth adjuster may be configured to operate automatically and concurrently to move the tabletop in three dimensions at the same time.

According to another embodiment, there is a method of moving a tabletop of a workstation in one or more dimensions relative to a user position. The method may be performed by a controller that is configured to send control signals to one or more actuators to move the tabletop. The method may include determining a range and speed of motion according to a user profile for a user of the workstation, and moving the tabletop automatically horizontally at the speed of motion along an arcuate path extending across the range of motion with respect to the user position.

In at least one embodiment, the method may further include moving the tabletop automatically and concurrently between a first height and a second height.

In at least one embodiment, the method may further include moving the tabletop automatically and concurrently horizontally toward or away from the user position.

In at least one embodiment, there is provided a workstation including a tabletop, a powered height adjuster coupled to the tabletop and configured to move the tabletop vertically between at least a first height and a second height. The workstation may also include a powered depth adjuster coupled to the tabletop, the depth adjuster configured to automatically move the tabletop horizontally while the height adjuster moves the tabletop between the first height and the second height.

In at least one embodiment, while the height adjuster moves the tabletop between the first height and the second height, the depth adjuster may be configured to automatically move the tabletop in a first horizontal direction and in a second horizontal direction opposite the first horizontal direction.

In at least one embodiment, the depth adjuster may be configured to automatically move the tabletop continuously in a first horizontal direction while the height adjuster moves the tabletop between the first height and the second height.

In at least one embodiment, the workstation may include a controller that is configured to automatically actuate the powered height adjuster and the powered depth adjuster according to a user profile.

In at least one embodiment, the controller may include a processor, and a user device reader for reading a user device. The user device may store at least a user ID that is associated with the user profile.

In at least one embodiment the controller may be configured to determine, from a user profile associated with the user ID, a speed and actuation periodicity for each of the powered height adjuster and the powered depth adjuster. The controller may be further configured to automatically actuate the powered height adjuster and the powered depth adjuster at the respectively determined speed and actuation periodicity.

In at least one embodiment, the controller may be further configured to determine a termination condition, and in response to the determined termination condition, actuate the powered height adjuster to move the tabletop vertically to a default height, and actuate the powered depth adjuster to move the tabletop horizontally to change the distance between the tabletop and a user position to a default distance.

According to another embodiment, there is a workstation including a tabletop, a first platform, a vertical support coupled to the tabletop and the first platform for supporting the tabletop vertically above the first platform, and a powered rotator coupled to the first platform. The powered rotator may be configured to pivot the first platform and the tabletop horizontally along an arcuate path with respect to a user position. The user position and a center of the arcuate path may each be disposed away from a forward edge of the tabletop.

In at least one embodiment, the workstation may also include a chair support coupled to the first platform, the chair support being securable to a chair.

In at least one embodiment, the chair support may be adapted to prevent a chair mounted thereto from rotating.

In at least one embodiment the chair support may be adapted to delimit forward and backward movement of a chair mounted thereto.

In at least one embodiment, the workstation may also include a powered height adjuster for adjusting a vertical height of the tabletop, and a powered depth adjuster for adjusting a distance between the forward edge of the tabletop and a user position.

In at least one embodiment, the powered rotator, the powered height adjuster and the powered depth adjuster may be configured to operate automatically and concurrently to move the tabletop in three dimensions at the same time.

According to another embodiment, there is a workstation including a tabletop, a powered height adjuster coupled to the tabletop and configured to move the tabletop vertically between at least a first height and a second height, and a controller. The controller may be configured to detect a connection to a user device, and in response to detecting the connection, automatically access a user profile corresponding to the user device and operate the powered height adjuster based upon the user profile.

In at least one embodiment, the controller may be further configured to in response to detecting the connection, determine a standing height and a seated height based on the user profile, and operate the powered height adjuster to move the tabletop vertically to alternate the height of the tabletop between the seated height and the standing height.

In at least one embodiment, the controller may be further configured to in response to detecting the connection, determine a periodicity of movement based on the user profile, and operate the powered height adjuster to move the tabletop vertically to alternate the height of the tabletop between the seated height and the standing height at the periodicity of movement.

In at least one embodiment, accessing the user profile corresponding to the user device comprises accessing the user profile stored on the user device.

In at least one embodiment, the controller may be further configured to detect a manual request to temporarily stop the tabletop, in response to detecting the request, stop the tabletop, after a predetermined time after stopping the tabletop, resume operation of the height adjuster based on the user profile.

In at least one embodiment, the controller may be further configured to detect a disconnection of the user device, and in response to detecting the disconnection, operate the height adjuster to move the tabletop to a predetermined default height.

In at least one embodiment, the workstation may also include a first platform, a vertical support coupled to the tabletop and the first platform for supporting the tabletop vertically above the first platform, and a powered rotator coupled to the first platform. The powered rotator may be configured to pivot the first platform and the tabletop horizontally along an arcuate path about a user location. The controller may be further configured to in response to detecting the connection, operate the powered rotator to pivot the first platform at a speed based on the user profile.

According to another embodiment, there is a method of moving a tabletop of a workstation in one or more dimensions relative to a user position, the method being performed by a controller that is configured to send control signals to one or more actuators to move the tabletop. The method may include moving the tabletop automatically between a first height and a second height, and moving the tabletop automatically and concurrently horizontally toward or away from the user position.

In at least one embodiment, the method may further include: detecting a connection to a user device, accessing a user profile associated with the user device, moving the tabletop automatically, at a speed and a range of motion vertically or horizontally toward or away from the user position based on the user profile.

In at least one embodiment, in response to detecting the connection, the method may further include determining a standing height and a seated height based on the user profile, and moving the tabletop vertically to alternate a height of the tabletop between the seated height and the standing height.

In at least one embodiment, in response to detecting the connection, the method may further include determining a periodicity of movement based on the user profile, and moving the tabletop vertically to alternate the height of the tabletop between the seated height and the standing height at the periodicity of movement.

In at least one embodiment, accessing the user profile corresponding to the user device may include accessing the user profile stored on the user device.

In at least one embodiment, the method may further include: detecting a manual request to temporarily stop the tabletop, stopping the tabletop in response to detecting the request, and resuming movement of the tabletop based on the user profile after a predetermined time after stopping the tabletop.

In at least one embodiment, the method may further include: detecting a disconnection of the user device, and moving the tabletop to a predetermined default position in response to detecting the disconnection.

In at least one embodiment, the method may further include: pivoting the tabletop automatically horizontally along an arcuate path with respect to the user position.

In at least one embodiment, the method may further include: receiving user tolerance measures for speed and range of motion, determining an adjusted speed and an adjusted range of vertical and horizontal motion based on the user profile and the user tolerance measures, and moving the tabletop automatically, at the adjusted speed and the adjusted range of motion vertically or horizontally toward or away from the user position.

According to another embodiment, there is a method of moving a tabletop of a workstation in one or more dimensions relative to a user position. The method may be performed by a controller that is configured to send control signals to one or more actuators to move the tabletop. The method may include determining a range and speed of motion according to a user profile for a user of the workstation, and pivoting the tabletop automatically horizontally at the speed of motion along an arcuate path extending across the range of motion with respect to the user position.

In at least one embodiment, the method may further include moving the tabletop automatically and concurrently between a first height and a second height.

In at least one embodiment, the method may further include moving the tabletop automatically and concurrently horizontally toward or away from the user position.

DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF VARIOUS EMBODIMENTS

Figure 1:
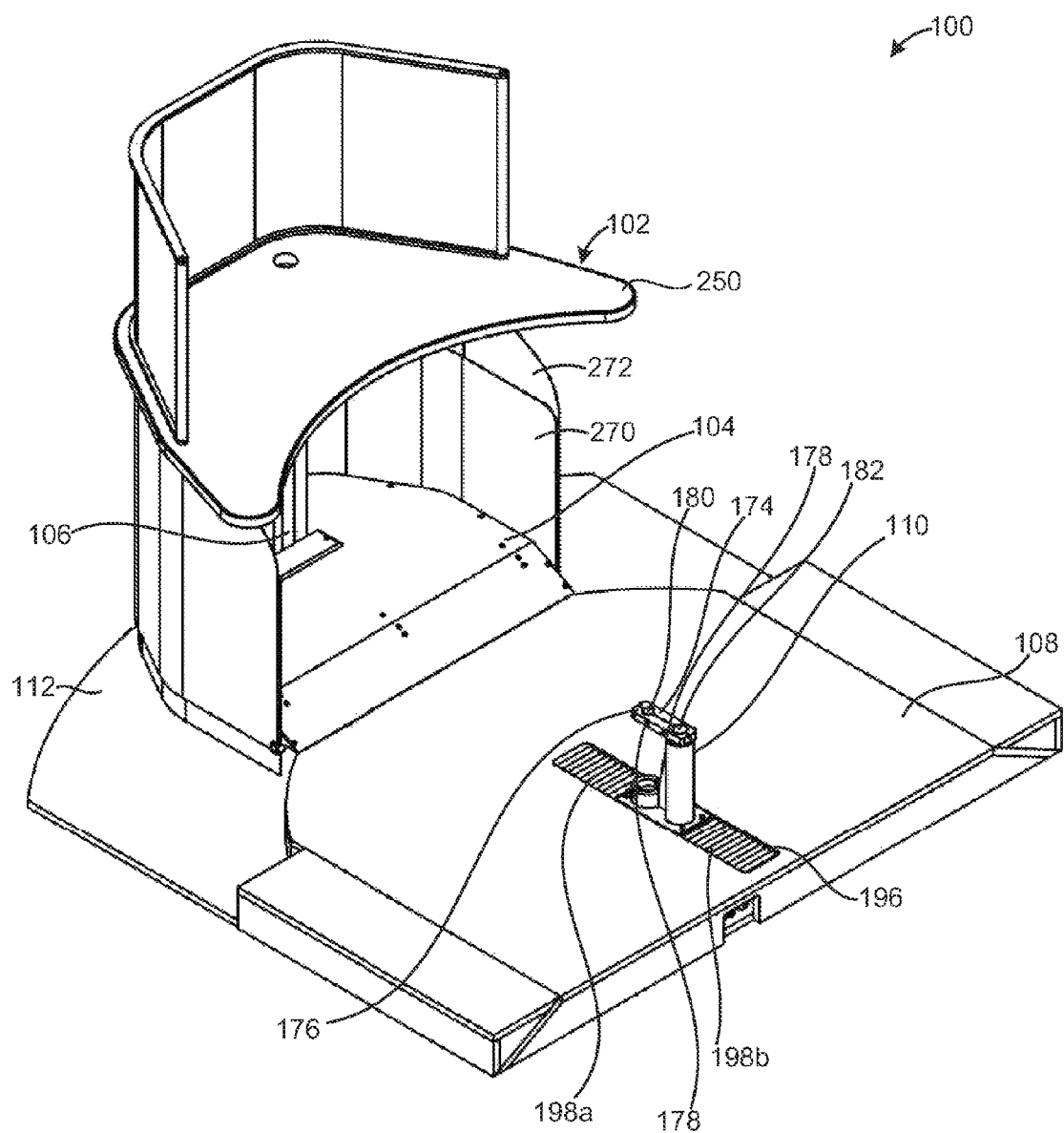
FIG. 1 shows a perspective view of a workstation in accordance with at least one embodiment.

Various apparatuses or processes will be described below to provide an example of an embodiment of the claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should be noted that terms of degree such as "substantially", "about" and "approximately" as used herein mean a reasonable amount of deviation of the modified term such that the end result is not significantly changed. These terms of degree should be construed as including a deviation of up to ±10% of the modified term if this deviation would not negate the meaning of the term it modifies.

As used herein, the term "connected" means a direct physical or electrical connection between the elements that are connected, without any intermediary elements connected in between. As used herein, the term "coupled" means either a direct connection between the elements that are connected, or an indirect connection through one or more intermediary elements. As used herein, the term "actuator" is used to refer to a powered height adjuster, a powered rotator, or a powered depth adjuster.

As used herein, the term "automatic" means without human interaction. For example, a controller may automatically operate a height adjuster to raise a tabletop based upon custom settings, as opposed to manually in response to a user pressing a button. In contrast, as used herein, the term "manual" means with human interaction. For example, a controller may stop the height adjuster in response to a manual request (e.g. a user pressing a button), as opposed to automatically based on programmed timing.

As used herein, the term "intermittent", "periodic" or "periodicity" means occurring in intervals that are separated by periods of pause. For example, a controller may periodically adjust the height of a tabletop such that it rises to a standing height, and stays at the standing height for 15 minutes, then lowers to a sitting height and stays at the sitting height for 15 minutes, and repeats.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about." The term "about" means up to ±10% of the number to which reference is being made.

In the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous.

While it has been found that lumbar supports can help to decrease intracranial pressure and paraspinal muscle hyperactivity, the use of lumber support alone may be insufficient to control lower back pain. However, it has been determined that the risk of developing lower back pain may be reduced by regular thoracic and lumbar spinal rotation, which may increase joint mobility throughout the spine thus allowing for the hydration of intervertebral discs and improving joint nutrition. At least one embodiment described herein provides a workstation that has a rotatable portion to rotate a table top about a user so that the user rotates their torso.

Furthermore, some studies suggest that workers tend not to alternate between standing and sitting often enough to relieve static musculoskeletal loading. At least one embodiment described herein provides a workstation having a controller that operates a height adjuster for automatically alternating a tabletop between a seated height and a standing height so that the user of the workstation moves from a sitting position to a standing position and vice-versa at a predefined periodicity of movement that is set for the user when the user is using the workstation.

Referring to FIG. 1, a perspective view of a workstation 100 is shown, in accordance with at least one embodiment. In the example shown, workstation 100 includes a tabletop assembly 102, a first platform 104, and a powered height adjuster 106.

Figure 2:
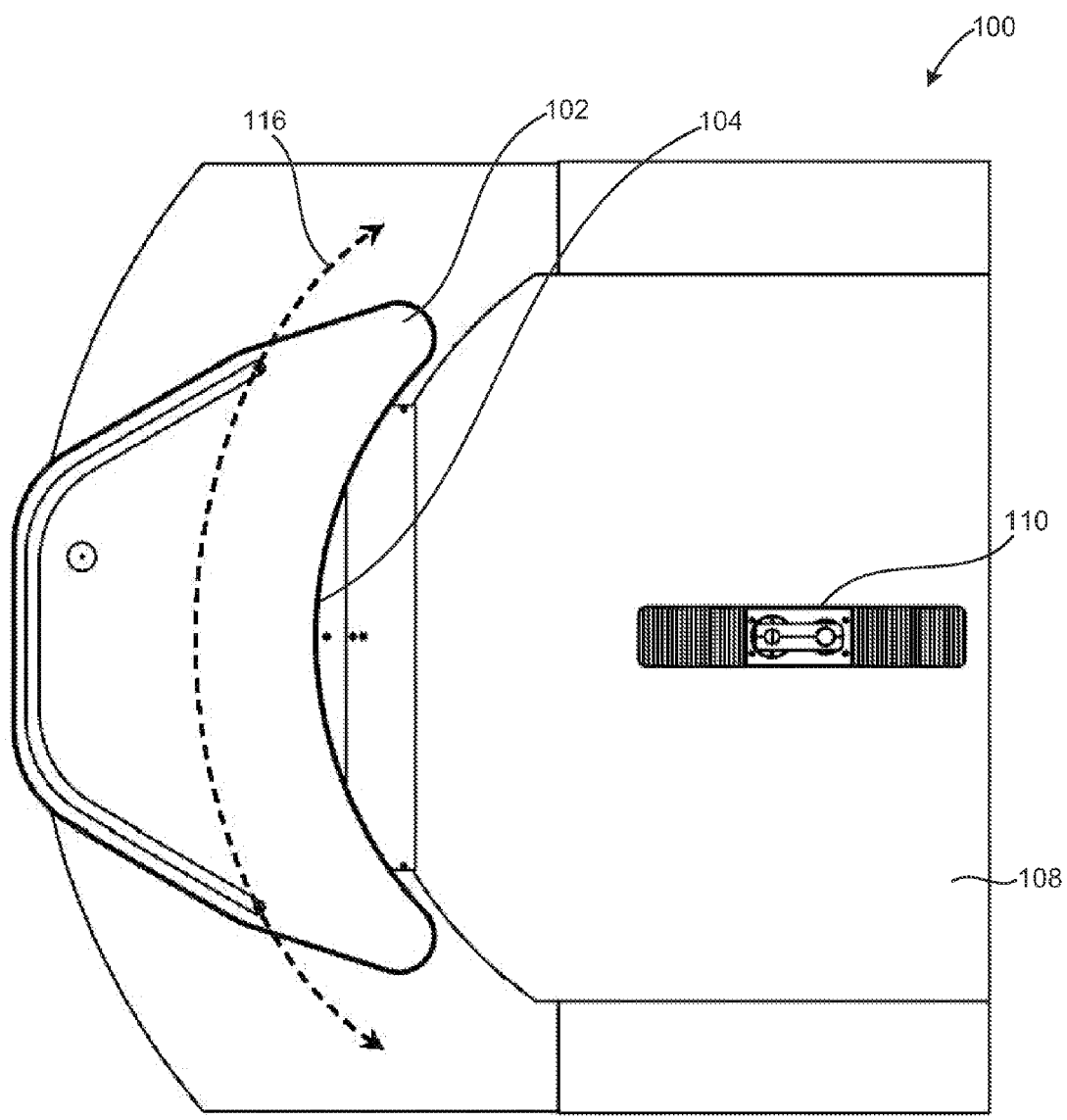
FIG. 2 shows a top plan view of the workstation of FIG. 1.

Reference is now made to FIGS. 1 and 2. FIG. 2 shows a top plan view of workstation 100. In at least one embodiment, first platform 104 may be configured to move along an arcuate path 116. In the example shown, first platform 104 carries tabletop assembly 102 and height adjuster 106 as it moves along arcuate path 116. As shown, height adjuster 106 is a vertical support connected to each of first platform 104 and tabletop assembly 102 for supporting tabletop assembly 102 above first platform 104.

Figure 3:
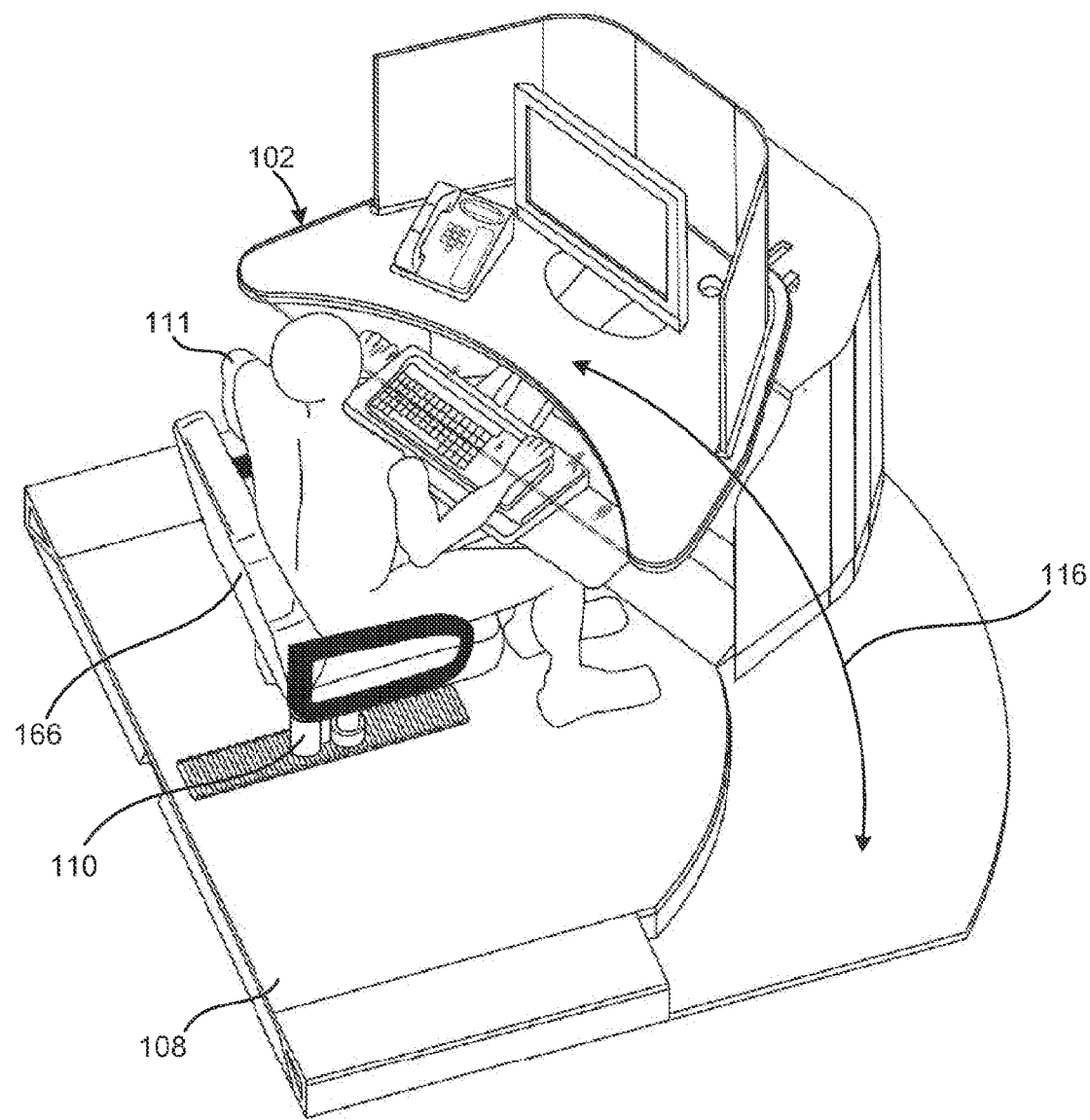
FIG. 3 shows a perspective view of a workstation in use in accordance with at least one embodiment.

In the example shown, workstation 100 includes a second platform 108 and a chair support 110. As best shown in FIG. 3, chair support 110 is configured to support a chair 166 in an upright position above second platform 108. In at least one embodiment, chair support 110 may also prevent chair 166 from rotating, as described in more detail below. Therefore, a user 111 may sit on chair 166 and rotate their upper torso, as shown, to follow tabletop assembly 102 as it moves along arcuate path 116. In at least one embodiment, this may provide thoracic and lumbar spinal rotation, which may increase joint mobility throughout the spine thus allowing for the hydration of intervertebral discs and improving joint nutrition.

In the example shown, the center of curvature of path 116 is proximate to the position of user 111. In some cases, the user position may coincide with the position of chair support 110 and chair 166 (e.g. when the user 111 is seated). Depending on the proximity of the user position to the center of curvature of path 116, the distance between tabletop assembly 102 and the user position may remain substantially constant as tabletop assembly 102 moves along path 116. In at least one embodiment, this may permit tabletop assembly 102 to remain at a comfortable distance from user 111 as tabletop assembly 102 moves along path 116. This may reduce the need for user 111 to adjust their position as tabletop assembly 102 moves along path 116 thereby limiting any disruption and lost productivity caused by the rotation.

In some cases, a user's center of gravity may be substantially coincident with the center of curvature of path 116. The torso rotation, of a user so positioned following tabletop assembly 102, would most likely occur throughout the thoracic and cervical spine.

In some cases, a user may move away from the center of curvature of path 116 to be closer or further from tabletop assembly 102, or to stand up, for example. For a user to follow the movement of tabletop assembly 102 while so positioned may require additional movement of the hips, lumbar spine and lower extremity. This may result in an increase in movement of several body parts, an increase in muscle contractions and an increase in energy expenditure.

Figure 4:
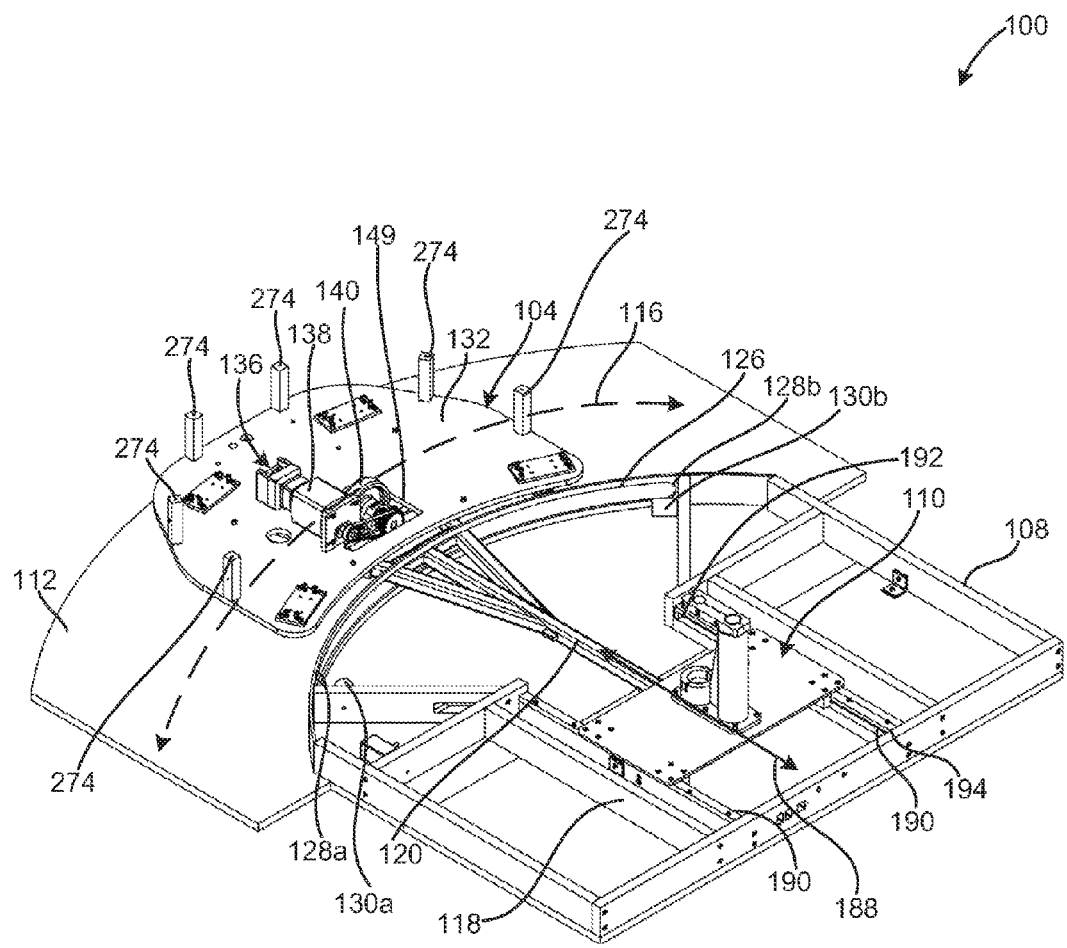
FIG. 4 shows a partial cutaway perspective view of the workstation of FIG. 1 in accordance with at least one embodiment.
Figure 5:
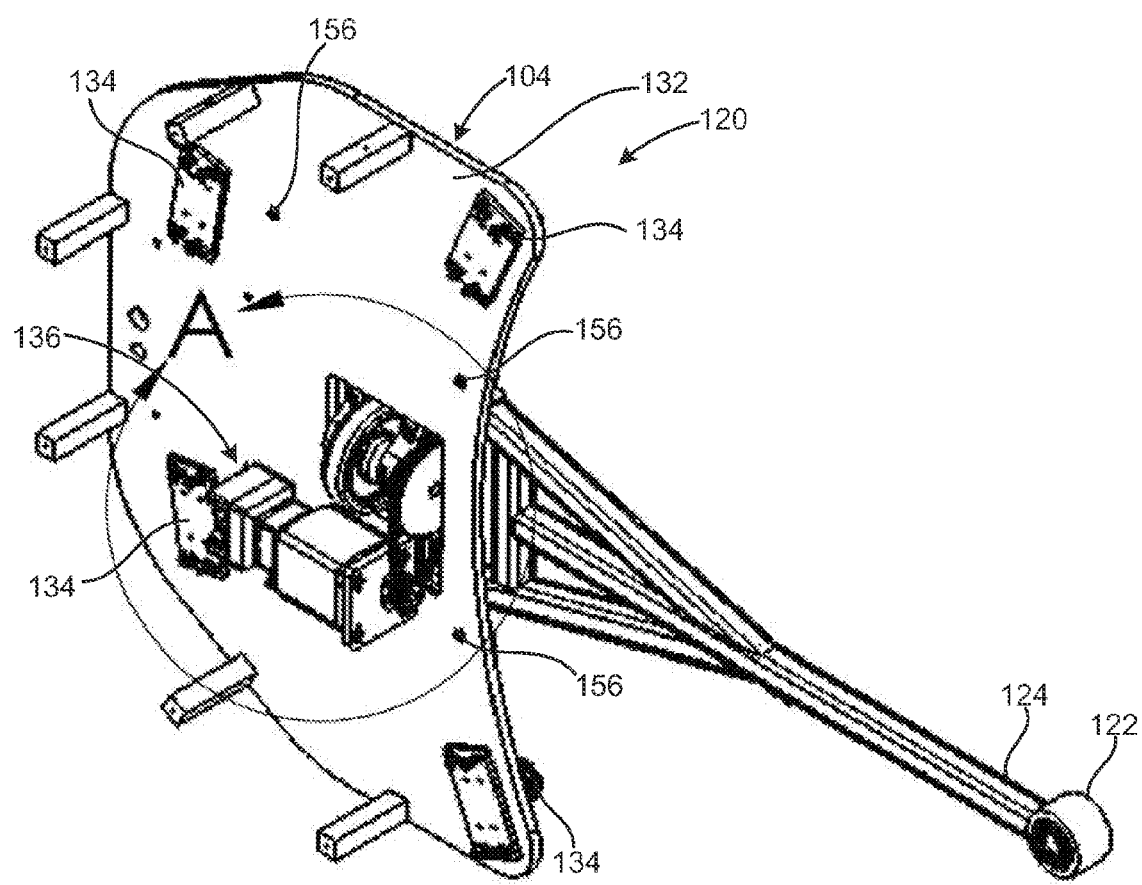
FIG. 5 shows a perspective view of a first platform and an arm in accordance with at least one embodiment.

Referring to FIG. 4, a partial cutaway perspective view of workstation 100 is shown, in accordance with at least one embodiment. As shown, first platform 104 is connected to second platform 108 by an arm 120. FIG. 5 shows a perspective view of first platform 104 and arm 120 in isolation. As shown, arm 120 may include a pivot mount 122 at a distal end 124 of arm 120. Referring again to FIG. 4, arm 120 is shown connected to second platform 108 at pivot mount 122 (obscured from view). In the example shown, first platform 104 can pivot about pivot mount 122 to travel along path 116. The center of curvature of path 116 coincides with the location of pivot mount 122.

Arm 120 is shown extending through a slot 126 in subframe 118. In the example shown, subframe 118 includes stops 130a, and 130b. Stops 130a and 130b may define the terminal ends of path 116. For example, first platform 104 may pivot counterclockwise until arm 120 contacts stop 130a, and first platform 104 may pivot clockwise until arm 120 contacts stop 130b. In other cases, arm 120 may be controlled so that it does not travel along the entire length of path 116 but rather only travels along a portion of path 116.

In the example shown, arcuate path 116, as terminated by stops 130a and 130b, extends through a range of motion of about 90 degrees. Generally, a range of motion may be selected which does not overstretch a user's thoracic spine thereby increasing pressure in their lumbar spine and risk of injury. Users with limited flexibility or back-related medical conditions may benefit from ranges of motion of 90 degrees or less. However, in alternative embodiments, arcuate path 116 may extend through from 10 degrees up to 180 degrees.

Slot 126 may be defined in part by surfaces 128a and 128b of subframe 118. In at least one embodiment, subframe 118 may not include stops 130a, and 130b because surfaces 128a and 128b may define the terminal ends of path 116. In that case, first platform 104 may pivot counterclockwise until arm 120 contacts surface 128a, and first platform 104 may pivot clockwise until arm 120 contacts surface 128b. In other cases, arm 120 may pivot along a portion of path 116.

Figure 6:
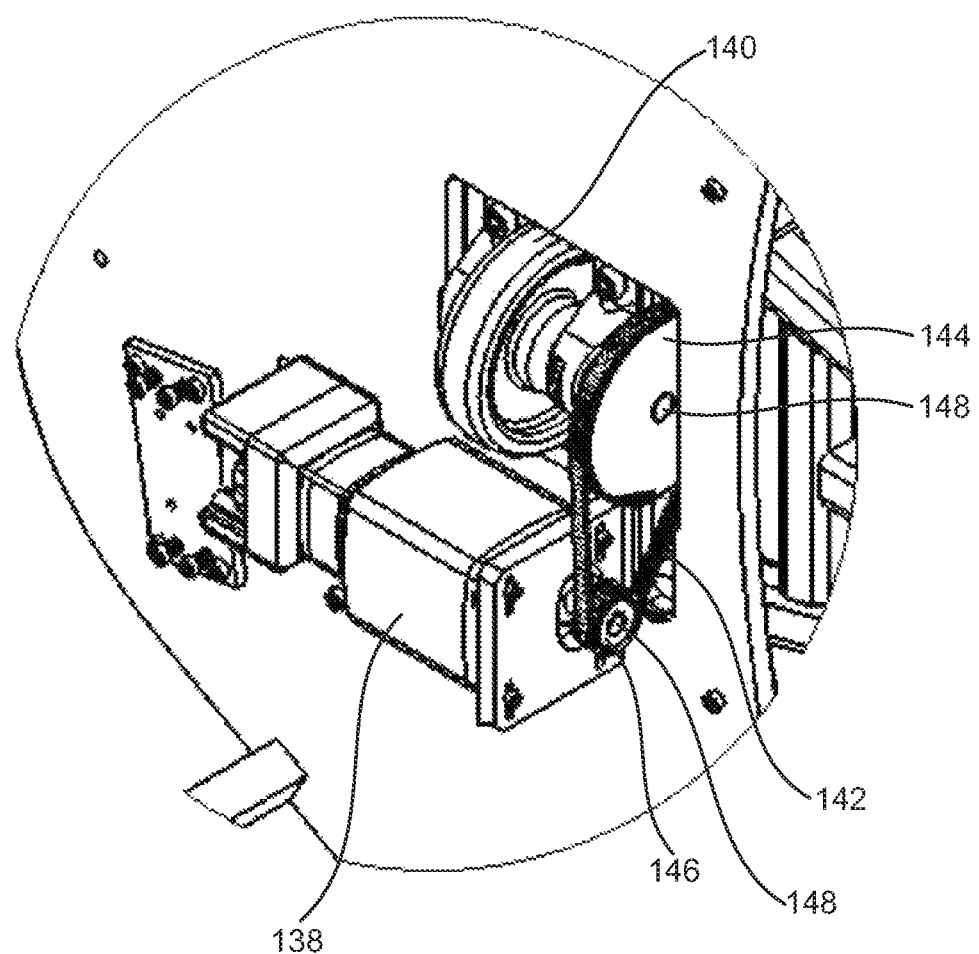
FIG. 6 shows a perspective view of a powered rotator in accordance with at least one embodiment.

In the example shown, first platform 104 is shown including a base 132. Support wheels 134, and a powered rotator 136 are shown mounted to base 132. As best shown in FIG. 6, powered rotator 136 may include a motor 138 and a drive wheel 140. In the example shown, motor 138 drives drive wheel 140 indirectly via drive belt 142. Drive belt 142 is connected drive gear 144 and output gear 146. Drive belt 142 transfers the rotary power applied to output gear 146, by motor 138, to drive gear 144. In the example shown, output gear 146 is coaxially connected to output shaft 148 of motor 138.

Drive gear 144 is shown having a larger diameter than output gear 146 to increase the torque to drive wheel 140. However, in alternative embodiments, drive gear 144 and output gear 146 may be the same size or drive gear 144 may have a smaller diameter than output gear 146 depending on the force required to rotate arm 120 and the strength of motor 138.

The figures show one example of a powered rotator 136. Other embodiments may include different suitable powered rotators, which may include, for example, a directly driven drive wheel 140. In this example, drive wheel 140 may be coaxially connected with output shaft 148 of motor 138. In at least one embodiment, powered rotator 136 may comprise a gearbox (not shown) to vary the torque applied to drive wheel 140.

Referring again to FIG. 4, drive wheel 140 is shown oriented generally perpendicularly to arm 120. Also, drive wheel 140 is shown sized and positioned to extend through an opening 149 in base 132 to make contact with floor 112 beneath first platform 104. In operation, powered rotator 136 may be operable so that motor 138 engages drive wheel 140. Wheel 140 may frictionally engage floor 112 as it rotates to move first platform 104 along arcuate path 116.

Figure 7:
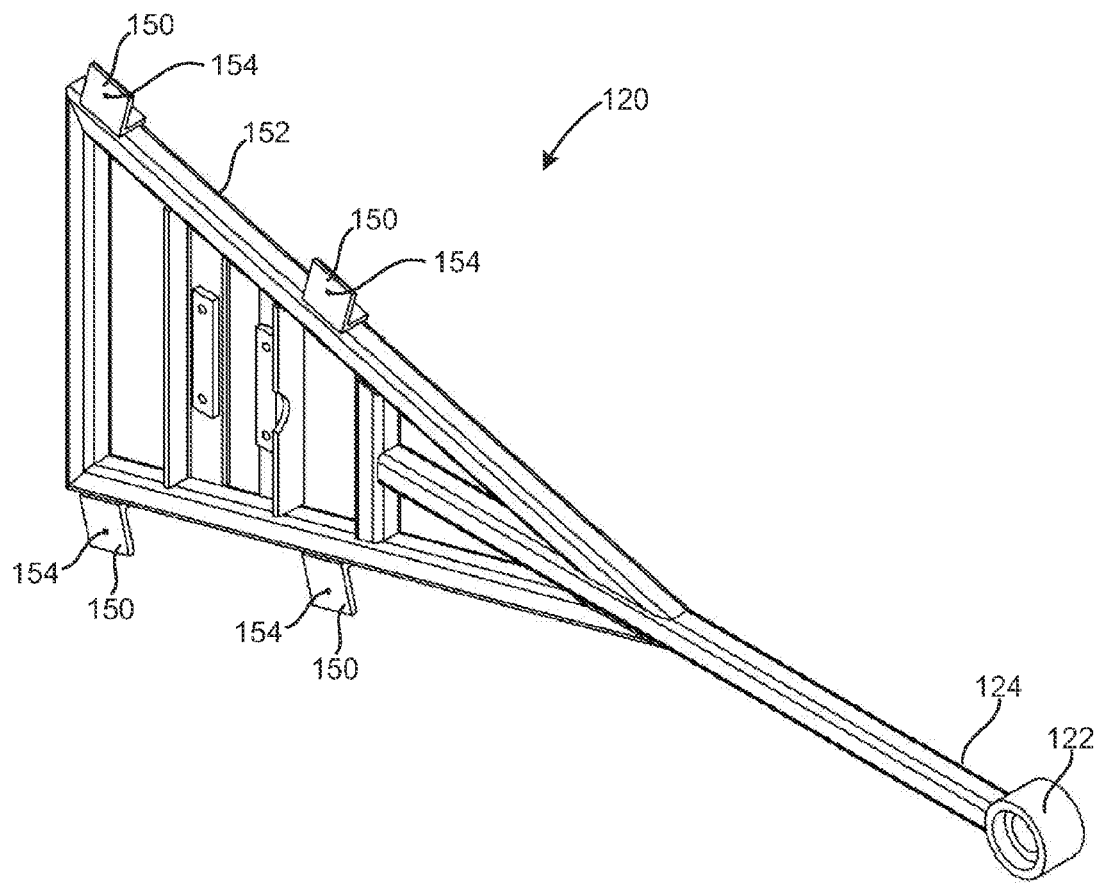
FIG. 7 shows a perspective view of the arm of FIG. 5.

Referring now to FIG. 7, a perspective view of arm 120 is shown in accordance with at least one embodiment. In the example shown, arm 120 includes pivot mount 122 at a distal end 124 and mounting brackets 150 at a proximal end 152. Mounting brackets 150 are configured with through-holes 154 for receiving fasteners 156 (shown in FIG. 5) for securing base 132 of first platform 104 to arm 120.

Figure 8:
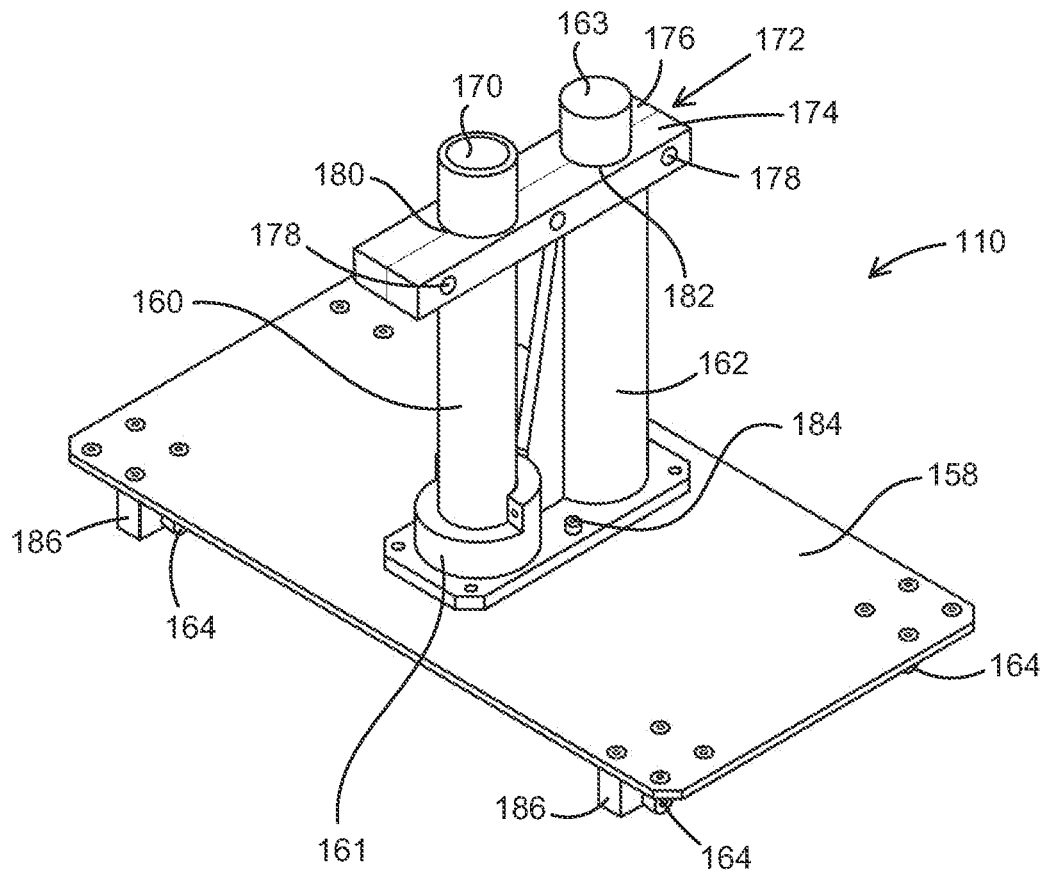
FIG. 8 shows a partial perspective view of a chair support in accordance with at least one embodiment.
Figure 9:
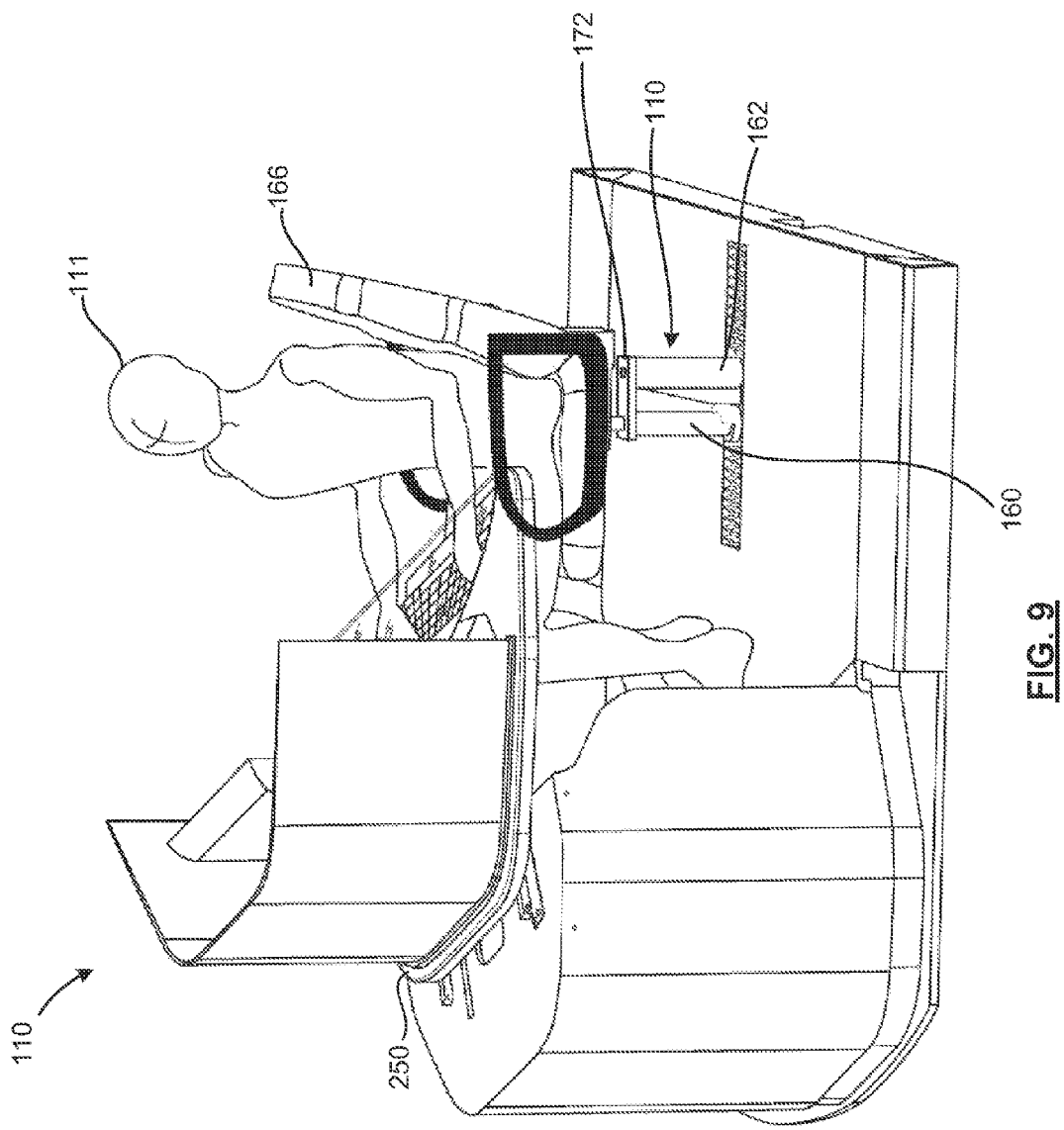
FIG. 9 shows a perspective view of the workstation of FIG. 3.

Reference is now made to FIGS. 8 and 9. FIG. 8 shows a partial perspective view of chair support 110 in accordance with at least one embodiment. FIG. 9 shows a perspective view of workstation 100, chair 166 and user 111 in accordance with at least one embodiment. In the example shown, chair support 110 includes a base 158 to which a post 160, a support 162 and track rollers 164 are connected. A rod 163 is connected to and extends from support 162.

In the example shown, chair 166 is an office chair from which the wheels have been removed. The pneumatic chair post 168 is shown received in an opening 170 in the post 160. In the example shown, post 160 and opening 170 are sized and shaped to receive chair post 168. In at least one embodiment, post 160 and opening 170 are sized and shaped to accommodate a standard sized chair post 168. This may permit a user to use a chair of their choosing with workstation 100 (e.g. a chair they may already own). In at least one embodiment, chair post 168 may not be able to rotate with respect to post 160. For example, post 160 and may be sized to form an interference fit with chair post 168 when chair post 168 is inserted into post 160.

As shown, chair support 110 includes a clamp 172. Clamp 172 may provide a rigid connection between chair 166 and support 162. This may prevent the rotation of chair 166 and also support chair 166 in the upright position. Clamp 172 is shown clamped onto post 160 and rod 163. As shown, clamp 172 includes a first portion 174 and a second portion 176 which are connected by fasteners 178. First and second portions 174 and 176 define first and second openings 180 and 182.

As shown, post 160 may be received in first opening 180, and rod 163 may be received in second opening 182. Afterwards, fasteners 178 may be tightened to urge the interior surfaces (not shown) of first and second openings 180 and 182 against post 160 and rod 163 respectively. This may increase friction between clamp 172 and post 160 such that post 160 cannot rotate with respect to clamp 172. Therefore, any rotation of post 160 about its longitudinal axis would require clamp 172 to move. However, because clamp 172 is attached to two stationary members (post 160 and rod 163), it is unable to move in the example shown. Therefore, in this example, clamp 172 effectively prevents post 160, chair post 168 and chair 166 from rotating with respect to base 158.

Referring again to FIG. 8, receptacle 161 and support 162 are shown secured to base 158 by fasteners 184. However, receptacle 161 and support 162 may each be secured to base 158 by any suitable means including by adhesive, magnetic attraction, bolts, screws, nails, rivets, welding or by integrally molding any one or more of receptacle 161, support 162 and base 158.

Chair support 110 is shown including track rollers 164. In the example shown, track rollers 164 are secured to base 158 by brackets 186. As shown, each track roller 164 is secured to a bracket 186 at a position spaced from base 158.

Referring now to FIGS. 4 and 8, chair support 110 may be slidably connected to second platform 108 to permit chair 166 to move forward and backwards relative to second platform 108. In at least one embodiment, this may provide an increase in muscle contractions throughout a user's lower extremity and torso.

In the example shown, each track roller 164 is positioned to make contact with a track 190 of subframe 118. As shown, track rollers 164 can slide forward and backward along tracks 190 as chair support 110 moves forward and backwards in the direction of arrow 188. This may permit a user 111 sitting in a chair 166 mounted to chair support 110 to easily adjust their horizontal distance to tabletop assembly 102.

Chair support 110 may be limited in its ability to move forward and rearward with respect to second platform 108. In the example shown, chair support 110 can slide forward until one or more track rollers 164 contacts a front end 192 of track 190. Similarly, chair support 110 can slide backwards until one or more track rollers 164 contacts a rear end 194 of track 190.

Figure 10:
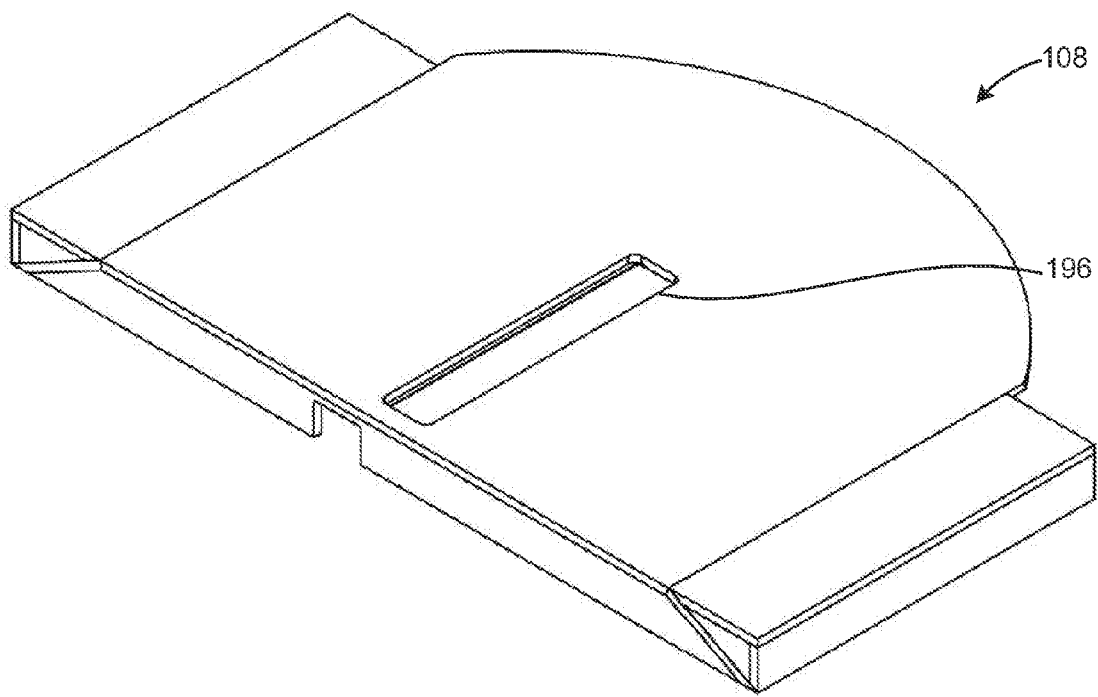
FIG. 10 shows a perspective view of a second platform in accordance with at least one embodiment.

Reference is now made to FIGS. 1 and 10. FIG. 10 shows a perspective view of second platform 108, in accordance with at least one embodiment. As shown, second platform 108 includes a slot 196 through which post 160 and support 162 may extend. In at least one embodiment, slot 196 may be covered by covers 198a and 198b. Covers 198a and 198b may hide the interiors of second platform 108 and prevent objects and body parts from entering second platform 108.

In the example shown, covers 198a and 198b are configured to extend and contract as chair support 110 moves forward and rearwards. For example, when chair support 110 moves forward, cover 198a may contract and cover 198b may extend, and vice versa. In some embodiments, each of covers 198a and 198b may be made from a loose length of fabric or another suitable material. Alternatively or in addition, one or both of covers 198a and 198b may be made from an elastic material which may be held in tension as they contract and expand. In some embodiments, covers 198a and 198b may be formed from a solid material. For example, one or both of covers 198a and 198b may be made from a plurality of rigid elements connected by hinges to form an accordion structure, which can extend and contract.

Figure 11:
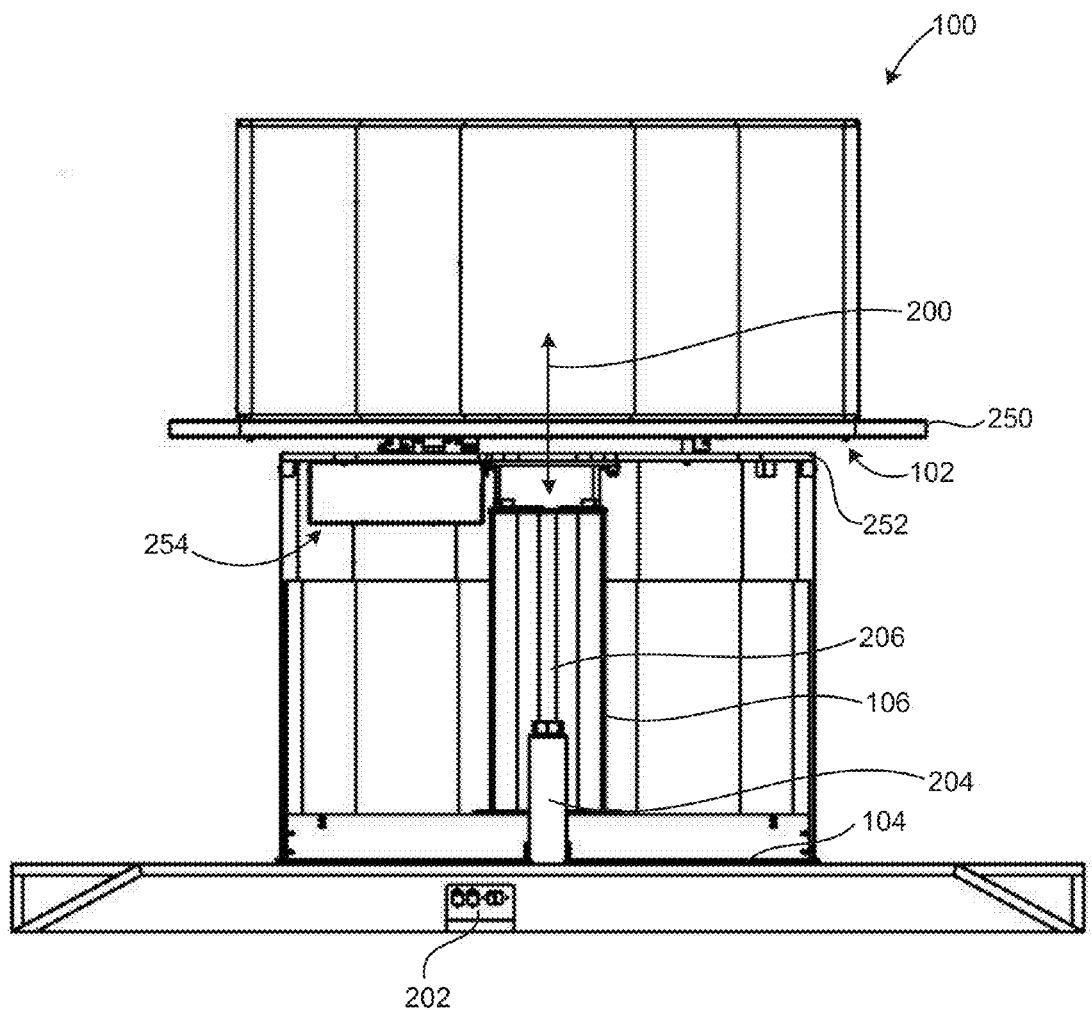
FIG. 11 shows a rear elevation view of the workstation of FIG. 1.

Referring now to FIG. 11, a rear elevation view of workstation 100 is shown in accordance with at least one embodiment. In the example shown, workstation 100 includes powered height adjuster 106. Height adjuster 106 may be secured at one end to first platform 104 and secured at the other end to tabletop assembly 102 by any suitable method including using fasteners (e.g. bolts, screws, nails, rivets), welding, or by integrally molding height adjuster 106 with one or both of first platform 104 and tabletop assembly 102.

In the example shown, height adjuster 106 is operable to move tabletop assembly 102 vertically in the direction of arrow 200. Height adjuster 106 may include a worm, a complementary threaded opening and a driving motor (not shown). The worm and the driving motor may be secured to the first platform 104. Tabletop assembly 102 may include the complementary threaded opening. The worm may extend through and mesh with the complementary threaded opening. Rotation of the worm by the driving motor may cause relative movement between the worm and the complementary threaded opening (in a manner similar to a nut and bolt). In this manner, rotation of the worm by the driving motor may cause the tabletop assembly 102 to move upwardly or downwardly relative to the first platform 104.

In an alternative embodiment, height adjuster 106 may be substituted by another suitable mechanism such as, for example, an electric gear system. In at least one embodiment, height adjuster 106 may include a rack and pinion and a driving motor (not shown). The rack may be secured to one of the first platform 104 and the tabletop assembly 102. The pinion and driving motor may be secured to the other of the first platform 104 and the tabletop assembly 102. With the pinion meshed with the rack, the motor may drive the pinion to cause relative vertical movement of the pinion and the rack.

Tabletop assembly 102 includes a tabletop 250 and a base 252, in the example shown. In at least one embodiment, tabletop 250 may be horizontally moveable relative to base 252. In the example shown, a powered depth adjuster 254 is connected to table base 252 for moving tabletop 250 horizontally relative to base 252.

In the example shown, second platform 108 includes an entry 202 for cables (not shown). The cables may include one or more power cables, and one or more network communication cables, for example.

Figure 12:
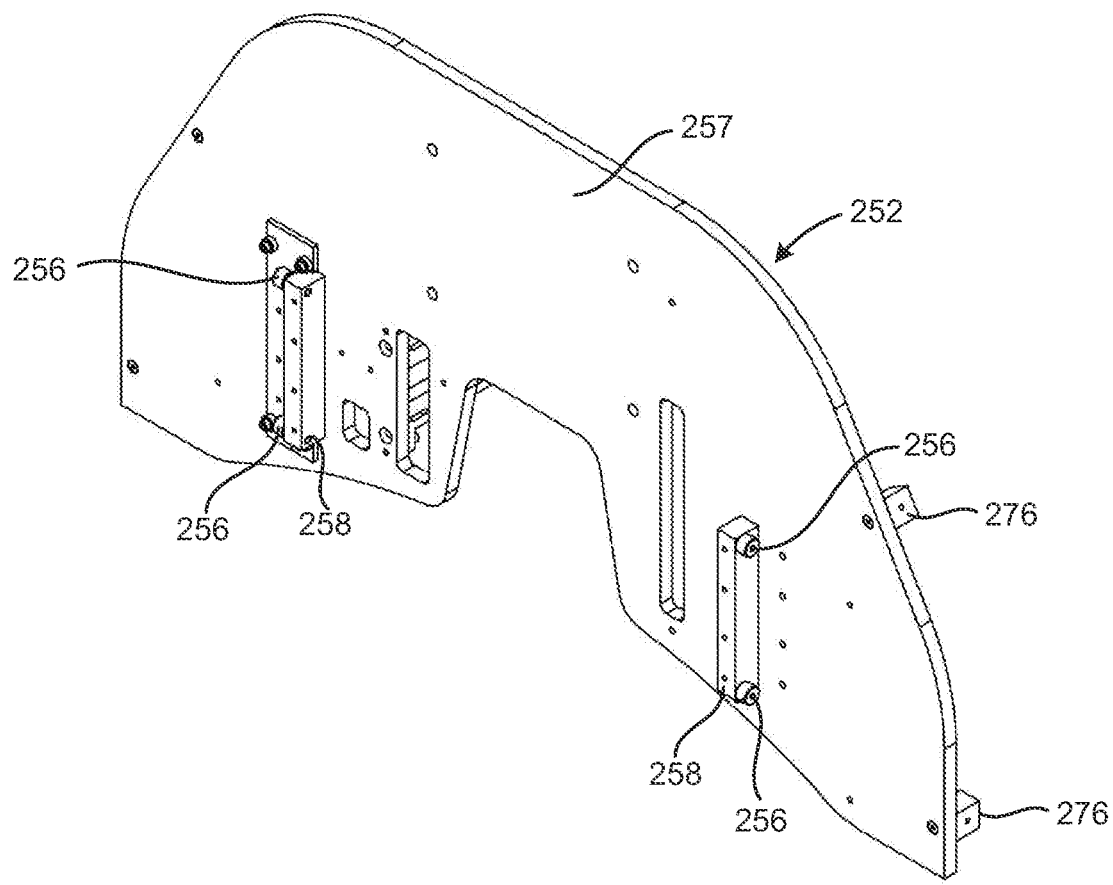
FIG. 12 shows a partial perspective view of a tabletop assembly base in accordance with at least one embodiment.
Figure 13:
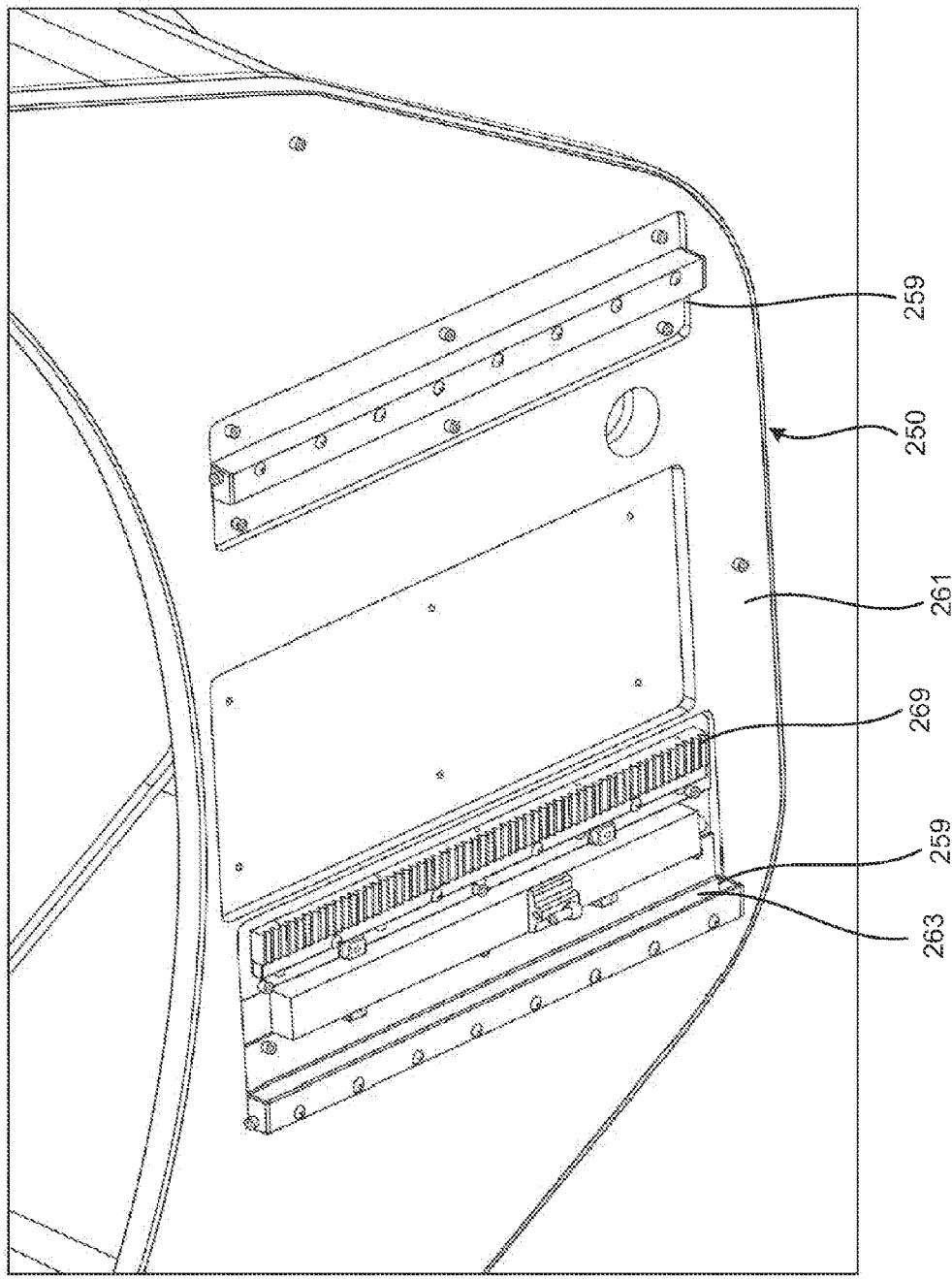
FIG. 13 shows a perspective view of a tabletop in accordance with at least one embodiment.

Reference is now made to FIGS. 12 and 13. FIG. 12 shows a perspective view of base 252 in accordance with at least one embodiment. FIG. 13 shows a partial perspective view of tabletop 250 in accordance with at least one embodiment. In the example shown, track rollers 256 are connected to an upper side 257 of base 252 by brackets 258. Tracks 259 are shown connected to a bottom side 261 of tabletop 250. In at least one embodiment, track rollers 256 may be configured to make contact with tracks 259 to slidably connect tabletop 250 and base 252. In the example shown, tracks 259 include a recess 263 configured to receive rollers 256.

Figure 14:
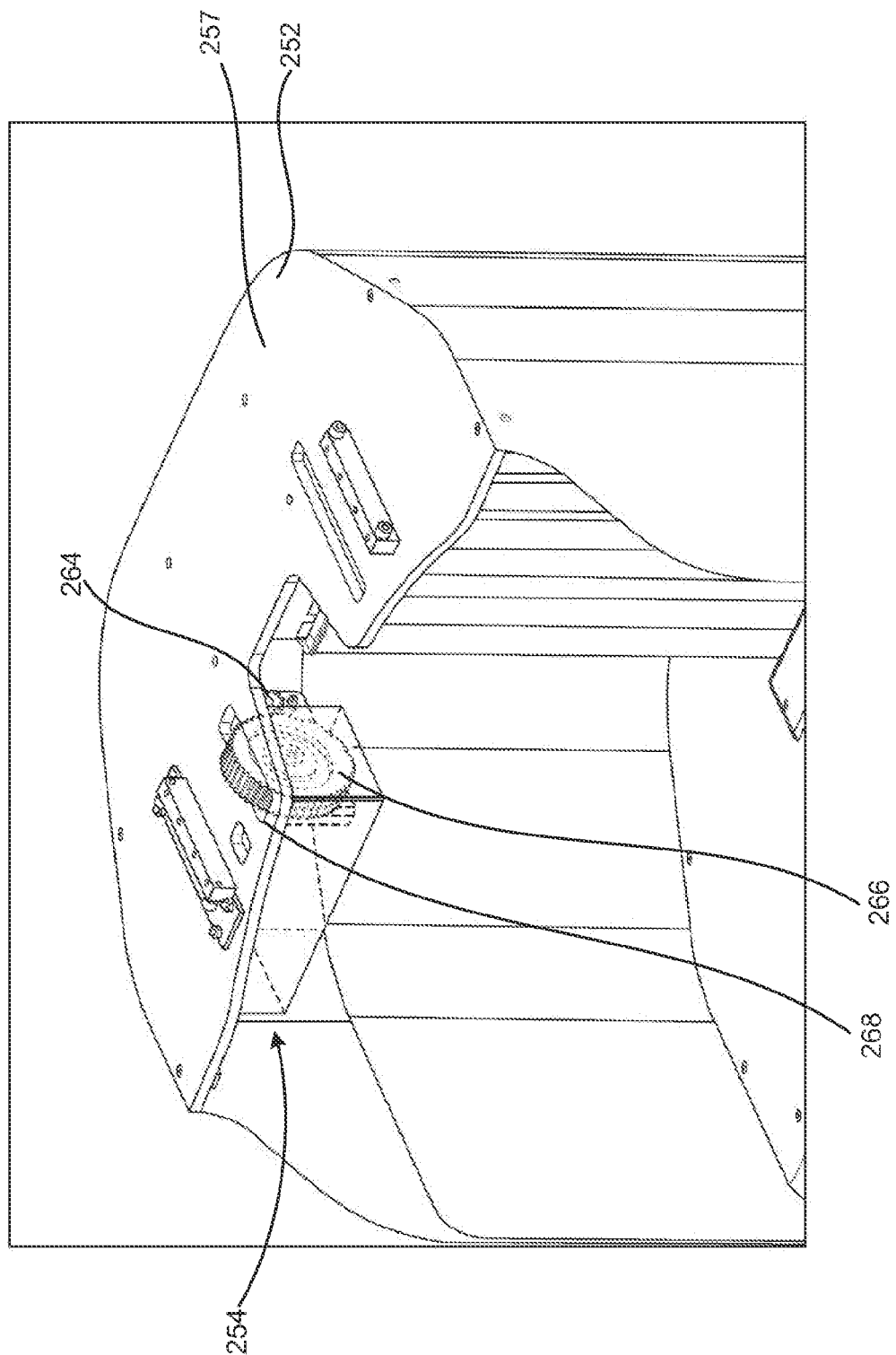
FIG. 14 shows a partial perspective view of the workstation of FIG. 1.
Figure 15:
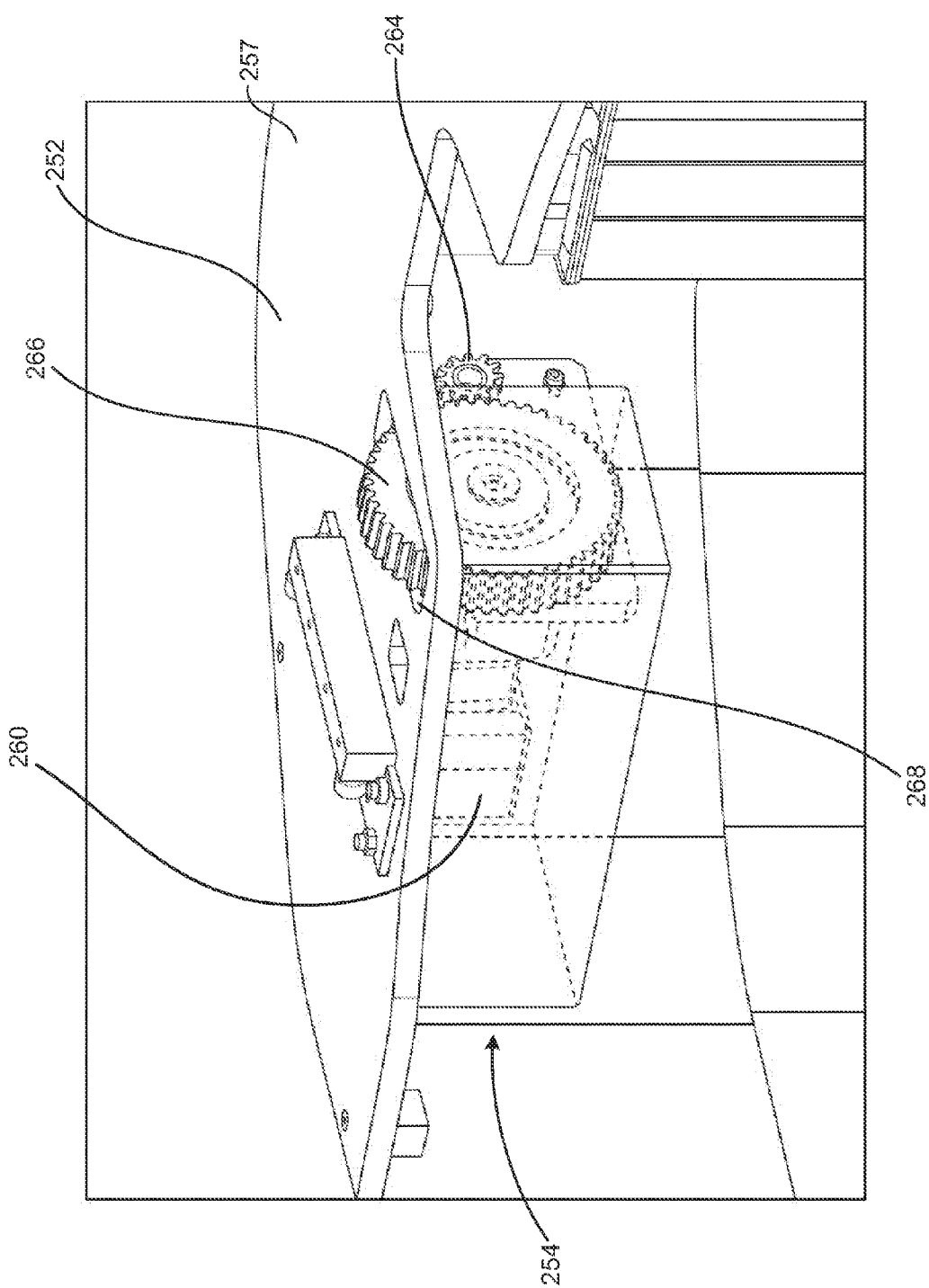
FIG. 15 shows a perspective view of a powered depth adjuster in accordance with at least one embodiment.

Referring now to FIGS. 14 and 15, base 252 is shown including powered depth adjuster 254. In the example shown, depth adjuster 254 includes a motor 260 that directly drives a drive gear 264 to indirectly drive a pinion 266. Drive gear 264 is shown meshed with pinion 266 to transfer the rotary power applied to drive gear 264 by motor 260 to pinion 266. In the example shown, pinion 266 has a diameter that is larger than drive gear 264 to increase the torque from motor 260. However, in alternative embodiments, pinion 266 may have an equal or smaller diameter than drive gear 264 depending on the strength of motor 260 and the amount of force needed to move tabletop 250.

Referring now to FIGS. 13-15, motor 260 and drive gear 264 are shown connected to the lower side of base 252. In the example shown, pinion 266 is sized to protrude through an opening 268. When upper side 257 of base 252 is coupled to the lower side 261 of tabletop 250, pinion 266 may engage rack 269. This may permit motor 260 drive pinion 266 along rack 269 to cause horizontal movement of tabletop 250 with respect to base 252. For example, FIG. 9 shows tabletop 250 after actuating depth adjuster 254 to move tabletop 250 forward toward user 111.

The figures illustrate one example of powered depth adjuster 254. Alternative embodiments may include different suitable powered depth adjusters. For example, in at least one embodiment, motor 260 may instead drive a wheel which makes frictional contact with the underside of tabletop 250 for moving tabletop 250 horizontally with respect to base 252. In another alternative embodiment, motor 260 may spin a spindle to wind a cord that is connected to the underside of tabletop 250 for moving tabletop 250 horizontally with respect to base 252. In still another alternative embodiment, depth adjuster 254 may use a pump to drive a hydraulic or pneumatic piston, connected at one end to base 252 and at the other end to tabletop 250, for moving tabletop 250 horizontally with respect to base 252.

Referring now to FIG. 1, workstation 100 is shown including a lower skirt 270 and an upper skirt 272. In the example shown, lower skirt 270 is connected to first platform 104 and upper skirt 272 is connected to tabletop assembly 102.

As best shown in FIG. 4, first platform 104 may include one or more brackets 274 for connecting lower skirt 270 to first platform 104. As best shown in FIG. 12, base 252 of tabletop assembly 102 may include one or more brackets 276 for connecting upper skirt 272 to tabletop assembly 102.

Referring again to FIG. 1, lower skirt 270 and upper skirt 272 are shown overlapping. When height adjuster 106 moves tabletop assembly 102 vertically upwards, lower skirt 270 and upper skirt 272 may telescope with respect to the other thereby reducing the overlap between the two. This allows the interior of workstation 100 under tabletop 250 to be hidden from view as tabletop 250 is moved up and down during operation.

Figure 20:
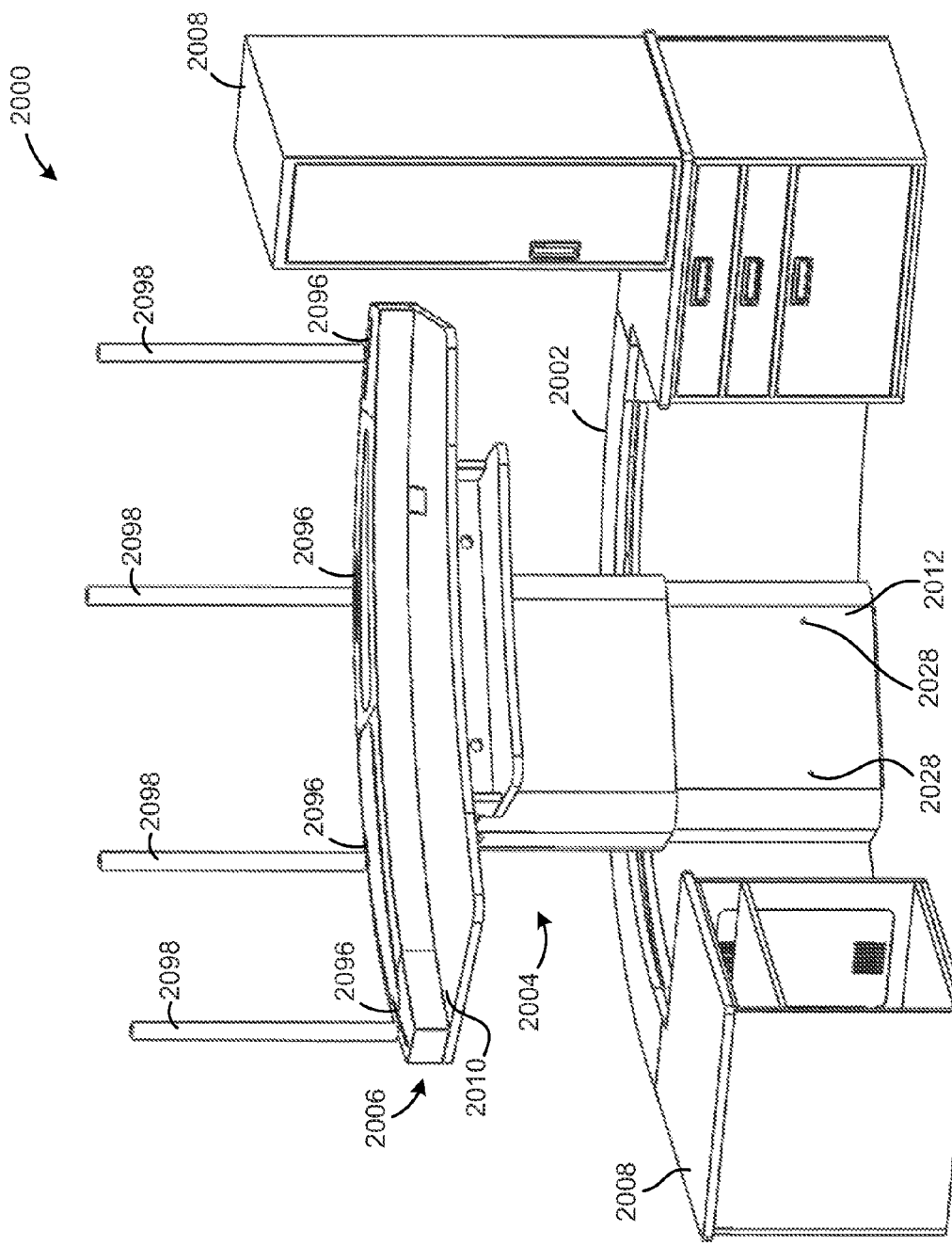
FIG. 20 shows a perspective view of another workstation, in accordance with at least one embodiment.

Referring now to FIG. 20, a perspective view of a workstation 2000 is shown in accordance with another embodiment. In the example shown, workstation 2000 includes an arcuate frame 2002, a power-adjustable support assembly 2004, a tabletop assembly 2006, and optional furniture 2008. As shown, tabletop assembly 2006, which includes tabletop 2010, is supported upright by power-adjustable support assembly 2004, which is mounted to arcuate frame 2002. In at least one embodiment, support assembly 2004 includes a powered height adjuster (obscured from view) for raising and lowering the height of tabletop assembly 2006, and a powered rotator for rotating tabletop assembly 2006 along a horizontal arcuate path defined by arcuate frame 2002. In some cases, tabletop assembly 2006 includes a powered depth adjuster for moving tabletop 2010 horizontally relative to power-adjustable support assembly 2004. The interior elements of support assembly 2004 are shown covered by a telescoping cover 2012.

Figure 21:
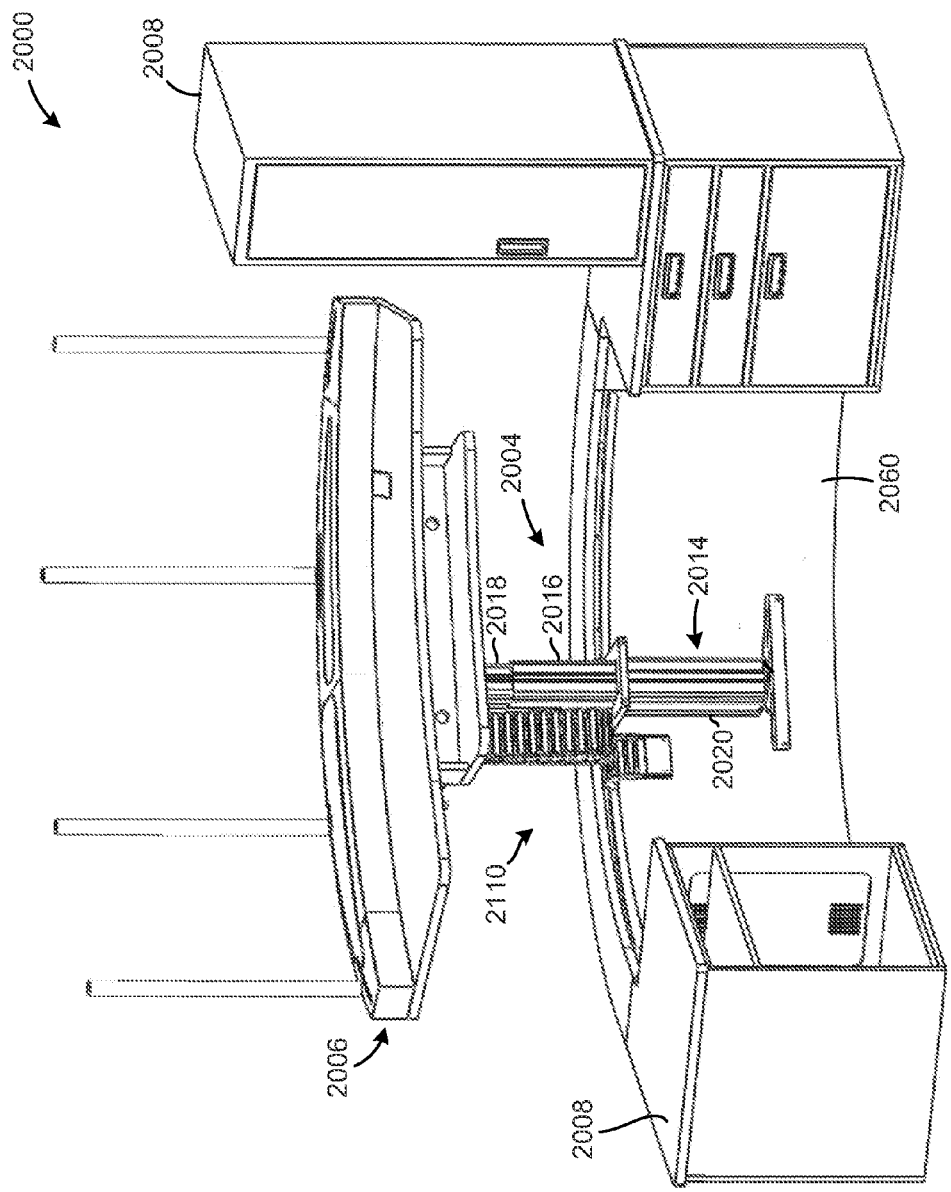
FIG. 21 shows a partial perspective view of the workstation of FIG. 20.

Referring now to FIG. 21, a partial perspective view of workstation 2000 is shown. In FIG. 21, telescoping cover 2012 of support assembly 2004 is omitted to reveal powered height adjuster 2014. In the example shown, powered height adjuster 2014 has a telescoping configuration for selectively extending and contracting to raise and lower tabletop assembly 2006. For example, powered height adjuster 2014 may be operable to move tabletop assembly 2006 between a seated height, and a standing height.

As shown, powered height adjuster 2014 includes a housing 2020 and two extensions 2016 and 2018. In the example shown, extensions 2016 and 2018 can selectively extend out of and above housing 2020 to raise tabletop assembly 2006, or nest inside housing 2020 to lower tabletop assembly 2006. In alternative embodiments, powered height adjuster 2014 includes one extension, or more than two extensions. In at least one embodiment, powered height adjuster 2014 is a known powered height adjuster.

In accordance with various embodiments, powered height adjuster 2014 can include any suitable mechanism to provide selective protraction and contraction. In one example (not shown), powered height adjuster 2014 includes a worm secured to housing 2020 that extends through and meshes with a complementary threaded opening coupled to extensions 2016 and 2018. In this example, a motor drives the worm to rotate causing relative vertical movement between the worm (fixed to housing 2020), and the threaded opening (coupled to extensions 2016 and 2018, and tabletop assembly 2006). Thereby, the height of tabletop assembly 2006 can be selectively adjusted in this example by controlling the motor that drives the worm.

In an alternative embodiment, powered height adjuster 2014 includes a gear mechanism to provide selective protraction and contraction. In one example, powered height adjuster 2014 includes a pinion meshed with a rack, and a motor (not shown). In this example, the rack is coupled to extensions 2016 and 2018, and the motor with the pinion is secured to housing 2020. The motor in this example can drive the rotation of the pinion to cause relative vertical movement between the pinion (secured to housing 2020), and the rack (coupled to extensions 2016 and 2018, and tabletop assembly 2006). Thereby, the height of tabletop assembly 2006 can be selectively adjusted in this example by controlling the motor that drives the pinion.

Figure 22:
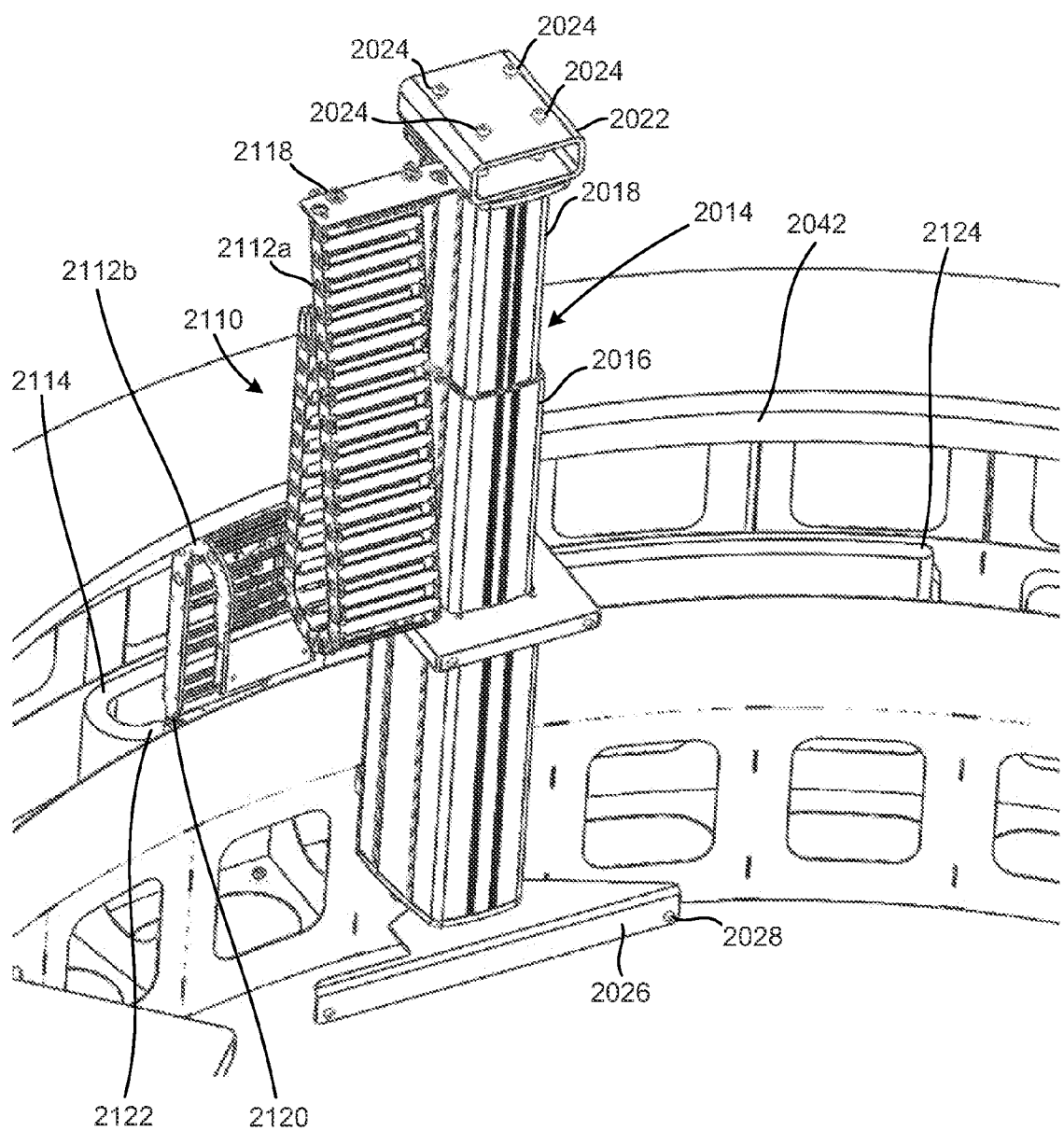
FIG. 22 shows a partial perspective view of a powered height adjuster, in accordance with at least one embodiment.

FIG. 22 shows a partial perspective view of powered height adjuster 2014 without an attached tabletop assembly 2006. As shown, powered height adjuster 2014 includes a reveal mounting member 2022 secured atop extension 2018. Mounting member 2022 as shown includes four fasteners 2024 for fastening tabletop assembly 2006 (see FIG. 21) to powered height adjuster 2014. In alternative examples, tabletop assembly 2006 is secured to powered height adjuster 2014 by another suitable means such as by welds, rivets, adhesives, or nails for example.

Powered height adjuster 2014 as shown also includes a mounting member 2026. In the example shown, mounting member 2026 includes two fasteners 2028 for fastening telescoping cover 2012 (see FIG. 20) to the front of powered height adjuster 2014. As shown in FIG. 20, telescoping cover 2012 may hide the interior elements of power-adjustable support assembly 2004 from a front view and thereby provide a clean and uncluttered appearance. In at least some embodiments, telescoping cover 2012 may also prevent a user's legs or other objects from interfering with the operation of power-adjustable support assembly 2004.

Figure 23:
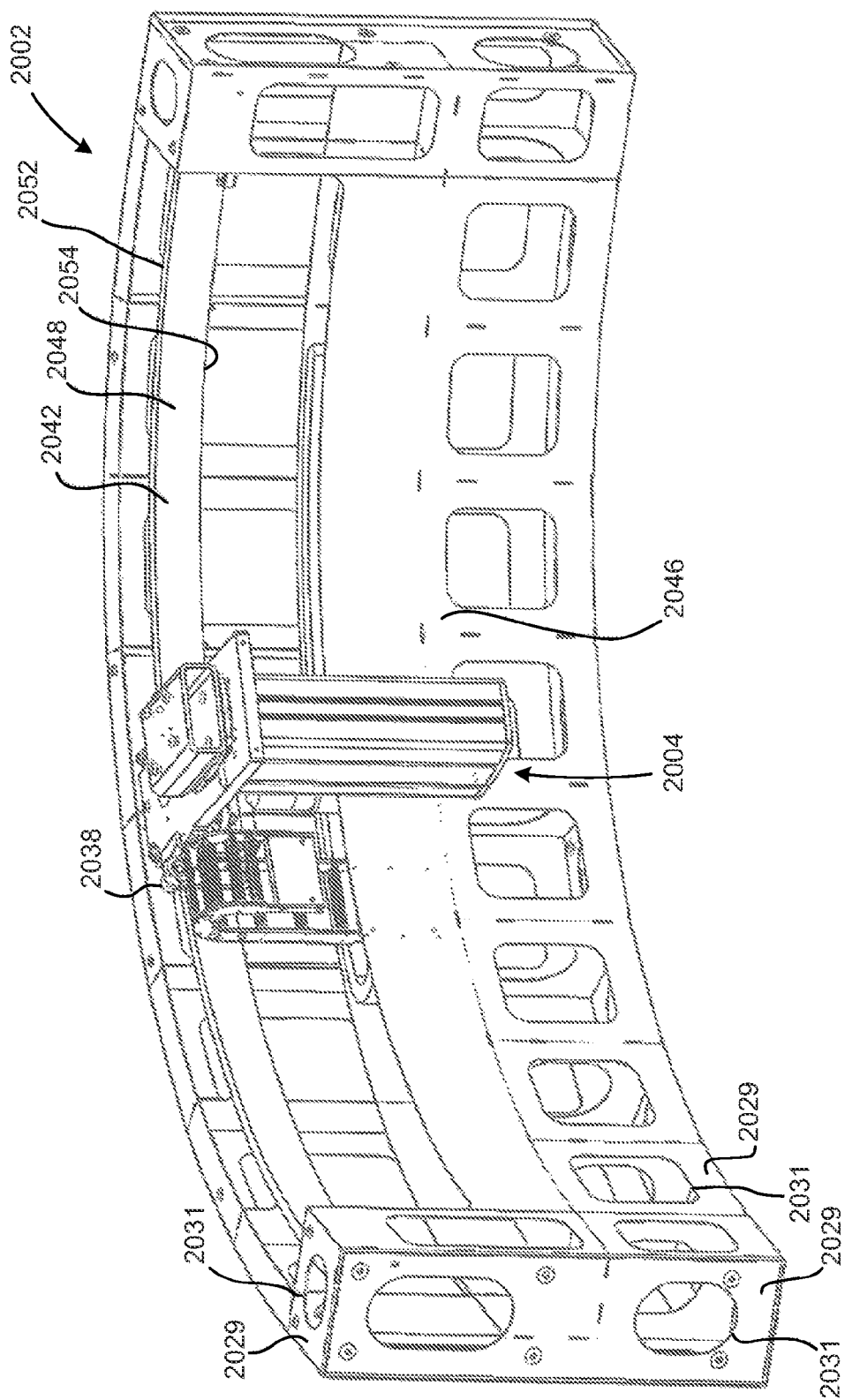
FIG. 23 shows a partial perspective view of a power-adjustable support assembly mounted to an arcuate frame, in accordance with at least one embodiment.

Referring now to FIG. 23, a partial perspective view of power-adjustable support assembly 2004 mounted to arcuate frame 2002 is shown, in accordance with at least one embodiment. In the example shown, the veneer of frame 2002 is omitted to expose the inner structure of frame 2002. Frame 2002 as shown includes a curved profile, when viewed from above, which defines the arcuate path along which powered rotator (obscured from view) of power-adjustable support assembly 2004 selectively travels.

Frame 2002 is shown having a construction of panels 2029 which provide structural integrity to frame 2002. In the example shown, panels 2029 include openings 2031 which may reduce the weight and material cost of frame 2002. In alternative embodiments, at least some panels 2029 do not include openings 2031, which may improve the strength of these panels 2029. Furthermore, in some alternative embodiments, frame 2002 includes a different construction that can support the load of power-adjustable support assembly 2004, and tabletop assembly 2006 when mounted thereto. In one example, frame 2002 has a construction of rods interconnected in a lattice configuration. In another example, frame 2002 includes a plurality of vertical, horizontal, and diagonal beams arranged as a truss. In any case, frame 2002 can be made from any one or more of a plurality of suitable materials such as metal, plastic, and carbon fiber for example.

Figure 24:
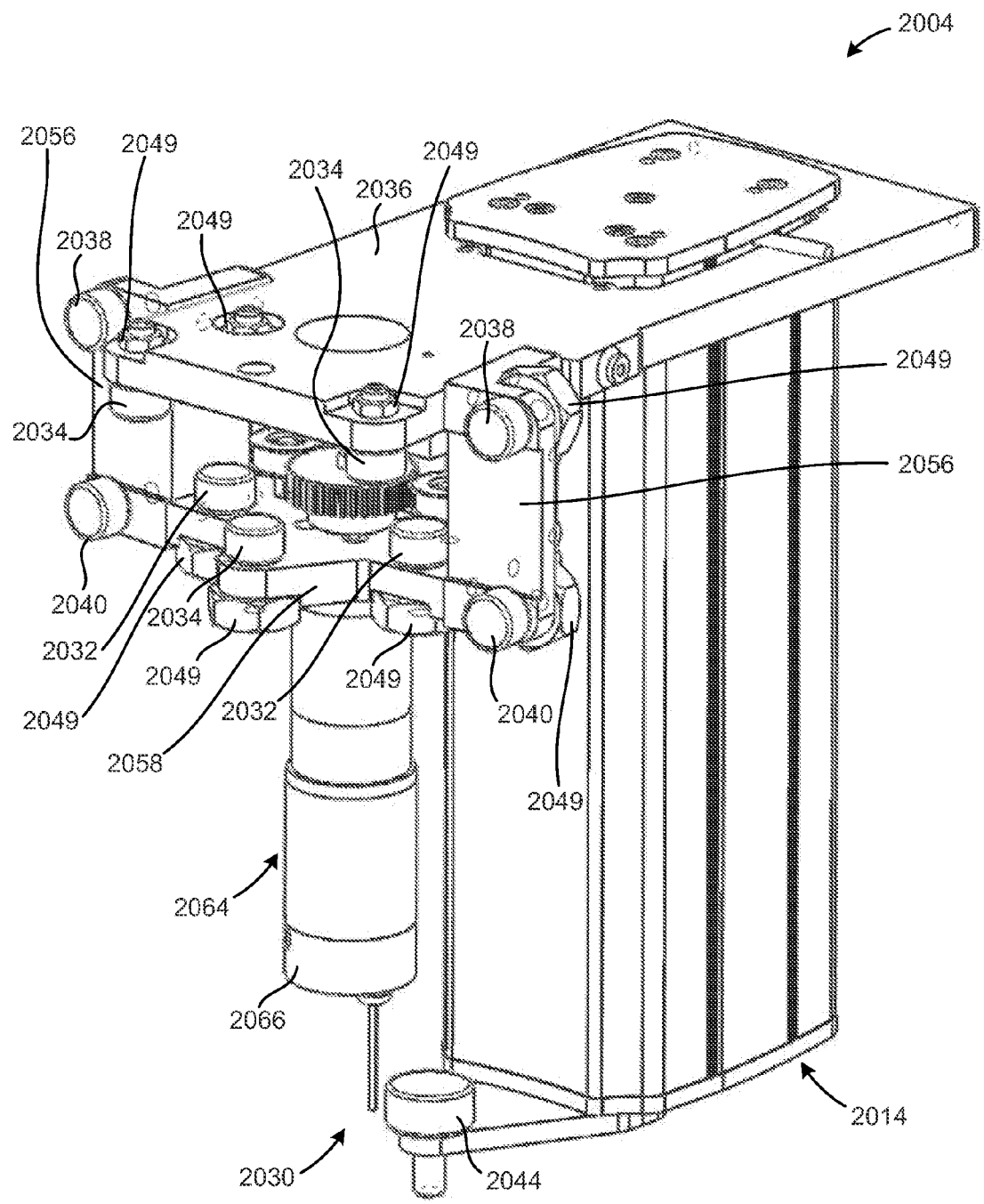
FIG. 24 shows a perspective view of a power-adjustable support assembly, in accordance with at least one embodiment.
Figure 25:
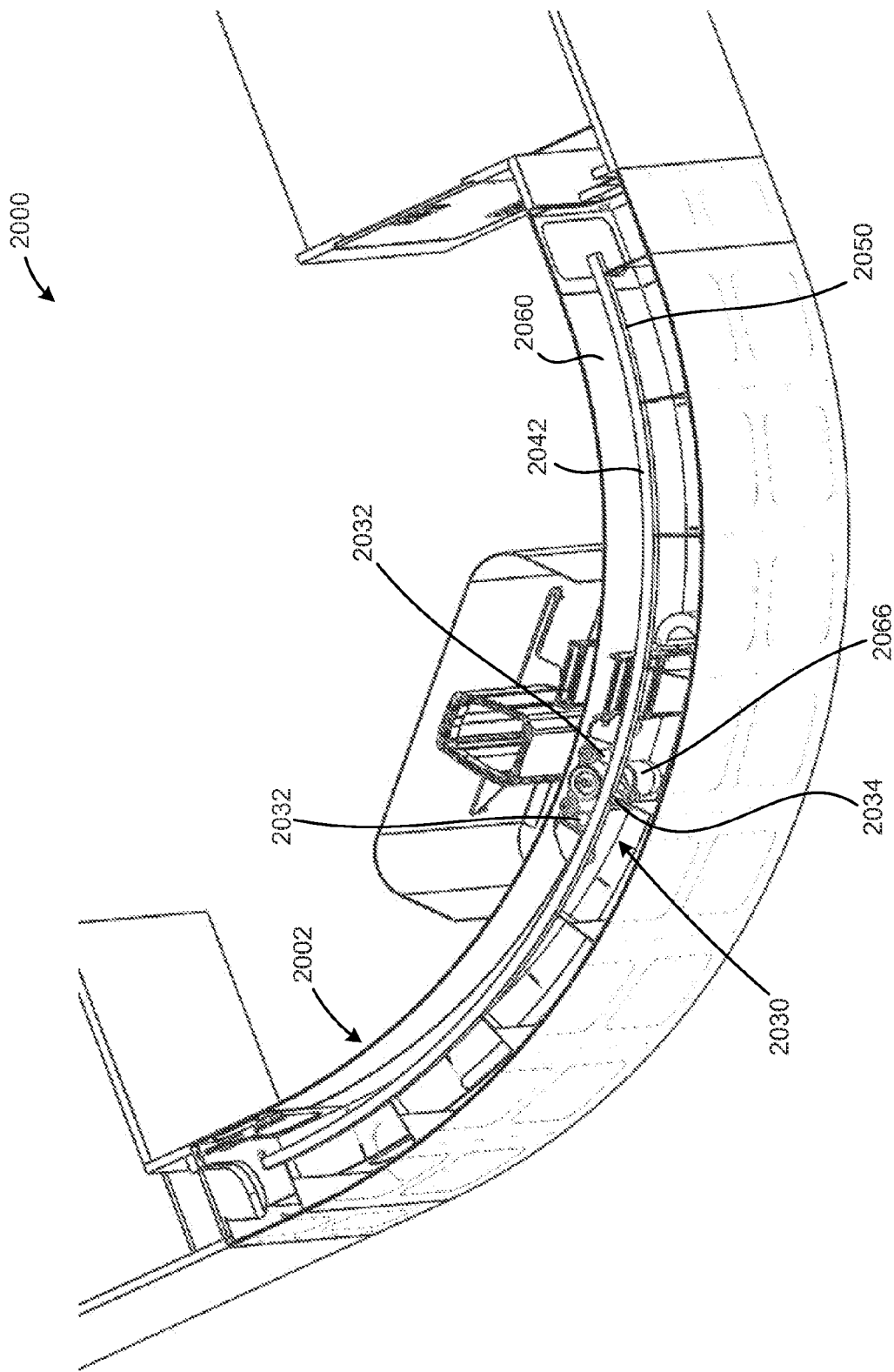
FIG. 25 shows a cut-away perspective view of the workstation of FIG. 20.

Reference is now made to FIGS. 24 and 25. FIG. 24 shows a perspective view of power-adjustable support assembly 2004 in isolation. FIG. 25 shows a cut-away perspective view of workstation 2000. In the example shown, power-adjustable support assembly 2004 includes powered rotator 2030, and powered height adjuster 2014. As shown, powered rotator 2030 is rigidly connected to powered height adjuster 2014 by a mounting plate 2036. In alternative embodiments, however, the coupling between powered rotator 2030 and powered height adjuster 2014 provides one or more degrees of movement and/or rotation between powered rotator 2030 and powered height adjuster 2014. In one example (not shown), powered rotator 2030 is pivotally coupled to powered height adjuster 2014, such that powered rotator 2030 can rotate about a vertical axis with respect to powered height adjuster 2014.

As shown, support frame 2002 includes a guide rail 2042 to which powered rotator 2030 is mounted by rollers. Powered rotator 2030 as shown includes front rollers 2032, rear rollers 2034, top rollers 2038, and bottom rollers 2040 which are configured to surround guide rail 2042 simultaneously engage the front, rear, top and bottom faces of guide rail 2042. Note that in FIG. 25 some rollers 2038 and 2034, mounting plate 2036, and an upper portion of guide rail 2042 are cut-away. As an example, the position of a top roller 2038 when power-adjustable support assembly 2004 is mounted to guide rail 2042 can be seen in FIG. 23.

Referring now to FIGS. 23 to 25, guide rail 2042 includes a front face 2048, a rear face 2050, a top face 2052, and a bottom face 2054. Power-adjustable support assembly 2004 is shown including mounting plate 2036, side mounting members 2056, and a lower mounting plate 2058, to each of which rollers are mounted by fasteners 2049. A front roller 2032 (obscured from view), and two rear rollers 2034 are shown fastened to mounting plate 2036 for making rolling contact with upper portions of front face 2048 and rear face 2050 of guide rail 2042, respectively. Two front rollers 2032, and one rear roller 2034 are shown fastened to lower mounting plate 2058 for making roller-contact with lower portions of front face 2048 and rear face 2050 of guide rail 2042, respectively. Further, a top roller 2038 and a bottom roller 2040 are fastened to each side mounting member 2056 for making rolling-contact with top face 2052 and bottom face 2054 of guide rail 2042, respectively.

In the example shown, rollers 2032, 2034, 2038 and 2040 rollingly couple power-adjustable support assembly 2004 (and tabletop assembly 2006) to guide rail 2042 for travel along guide rail 2042. This may provide a relatively low friction and low noise dynamic coupling between power-adjustable support assembly 2004, and guide rail 2042. In alternative embodiments, power-adjustable support assembly 2004 is slideably coupled to guide rail 2042 by direct sliding engagement of a coupling (e.g. a hook) to guide rail 2042.

In the example shown, guide rail 2042 defines the arcuate path along which powered rotator 2030 can cause tabletop assembly 2006 to travel. In at least some embodiments, powered rotator 2030 is selectively operable to rotate tabletop assembly 2006 to the left and to the right of a user by moving tabletop assembly 2006 along guide rail 2042. In so doing, a sitting or standing user of workstation 2000 may be encouraged to rotate their upper torso to follow tabletop assembly 2006 as it rotates to their left or to their right. In at least one embodiment, this may provide the user with thoracic rotation and lumbar side bending, which may increase joint mobility throughout the spine thus allowing for the hydration of intervertebral discs and improving joint nutrition.

As shown, rolling contact is made between each of the top, bottom, front and rear faces of guide rail 2042 and a plurality of rollers. In at least some embodiments, this may constrain the movement of power-adjustable support assembly 2004 to the arcuate path defined by guide rail 2042 and may further reduce undesirable play or wiggle between power-adjustable support assembly 2004 and guide rail 2042. Furthermore, in the example shown, powered height adjuster 2014 includes an additional front roller 2044 for making rolling contact with front panel 2046 (see FIG. 23) of frame 2002. In at least some embodiments, this may provide additional stability to power-adjustable support assembly 2004 when mounted to guide rail 2042 of frame 2002.

Guide rail 2042 as shown supports the load of power-adjustable support assembly 2004 (and tabletop assembly 2006) above the floor. In at least some embodiments, this may provide for a more adaptable workstation 2000 which is less reliant on the properties of the floor, which in different workplaces may be tiled, carpeted, or uneven for example. However, in alternative embodiments, power-adjustable support assembly 2004 includes a roller or a carpet slider for making rolling or sliding contact with the floor. This may permit the floor to support some of the load of power-adjustable support assembly 2004 and tabletop assembly 2006, which may be otherwise supported by guide rail 2042.

In some embodiments, as compared to the illustrated example power-adjustable support assembly 2004 includes a fewer or greater number of rollers, which contact as many or fewer faces of guide rail 2042. Furthermore, in some alternative embodiments (not shown), guide rail 2042 is cylindrical, and power-adjustable support assembly 2004 includes a sleeve for encircling the cylindrical guide rail instead of or in addition to rollers. In these embodiments, the sleeve slideably couples power-adjustable support assembly 2004 to guide rail 2042, and constrains the movement of power-adjustable support assembly 2004 to the arcuate path defined by guide rail 2042.

In the example shown, guide rail 2042 is positioned rear of front panel 2046 to which a front frame veneer 2060 is connected (see FIG. 25). In this configuration, front frame veneer 2060 is interposed between powered height adjuster 2014 and powered rotator 2030, thereby isolating powered rotator 2030 to an interior of frame 2002. In at least one embodiment, this may help suppress noise produced by powered rotator 2030 when activated to travel along guide rail 2042. As shown in FIG. 21, mounting plate 2036 connects powered height adjuster 2014 to powered rotator 2030 from above front frame veneer 2060. In alternate embodiments, guide rail 2042 is positioned to locate powered rotator 2030 outside of frame 2002. This may provide easy access to powered rotator 2030 for maintenance and repair.

Figure 26:
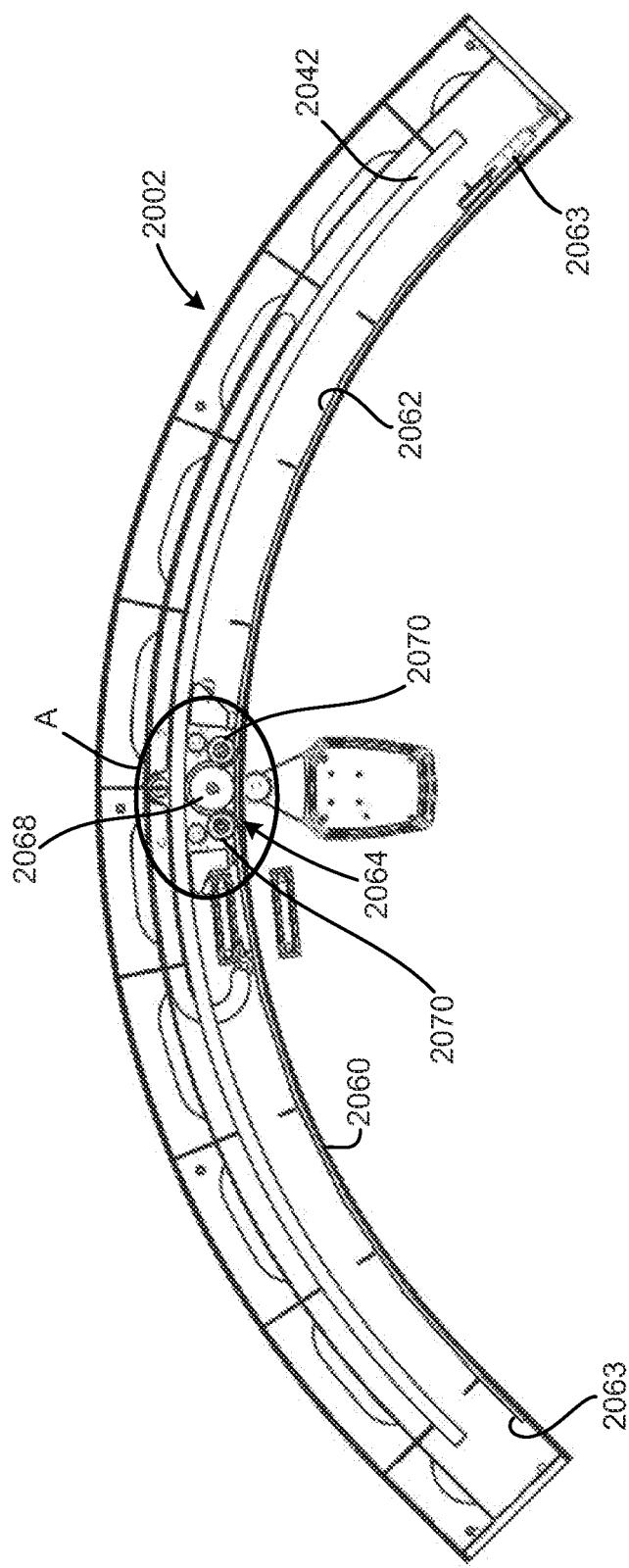
FIG. 26 shows a partial top plan view of the workstation of FIG. 20.
Figure 27:
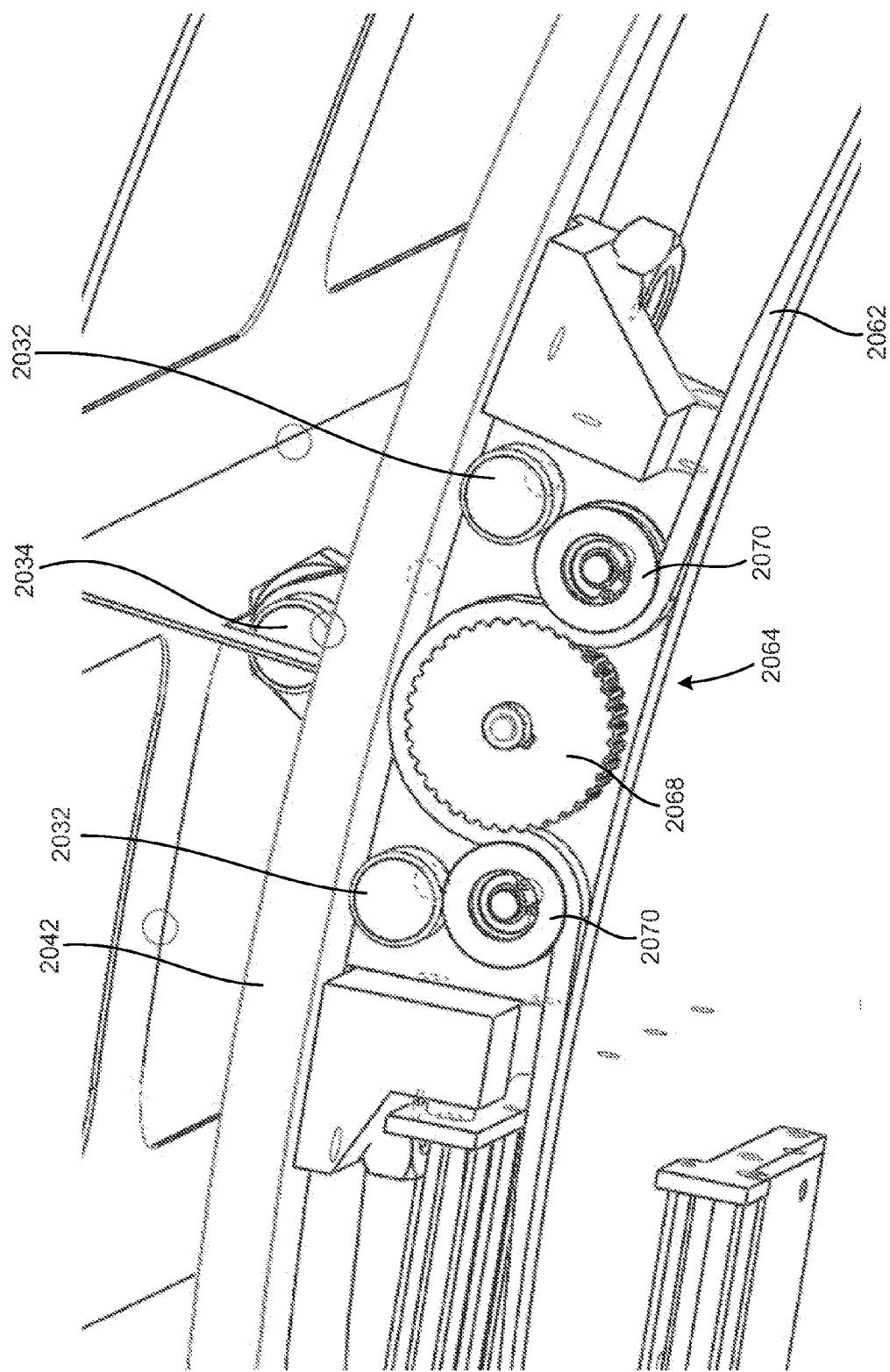
FIG. 27 shows an enlarged perspective view of region A of FIG. 26.

Reference is now made to FIGS. 24, 26 and 27. FIG. 26 is a partial top plan view of workstation 2000. In FIG. 26, tabletop assembly 2006, and mounting plate 2036 are omitted. FIG. 27 is an enlarged perspective view of region A in FIG. 26. In the example shown, a drive belt 2062 is mounted at its ends 2063 to arcuate frame 2002. As shown, drive belt 2062 is held under tension against front frame veneer 2060, except in the region where drive belt 2062 feeds through powered rotator 2030. Drive belt 2062 can be made of any one or more suitable materials, such as rubber, silicone, plastic and metal for example. Although drive belt 2062 is illustrated for simplicity as a continuous length of material, in alternative embodiments drive belt 2062 is composed of a chain of discrete links (e.g. as in a bicycle chain).

In the example shown, powered rotator 2030 includes a drive assembly 2064. Drive assembly 2064 as shown includes a motor 2066 (see FIG. 24), a gear 2068, and two guides 2070. As shown in FIG. 24, motor 2066 drives gear 2068 directly. However, in alternative embodiments, motor 2066 drives gear 2068 indirectly by, e.g. a belt or a gear train (not shown). Drive belt 2062 as shown extends through drive assembly 2064 from a front side of each guide 2070 and along a rear side of gear 2068, thereby engaging with gear 2068. In operation, when motor 2066 drives gear 2068 to rotate, gear 2068 travels along drive belt 2062 drawing drive belt 2062 through drive assembly 2064. Power-adjustable support assembly 2004 is induced to travel along guide rail 2042 by the tensile force applied by gear 2068 to drive belt 2062.

As shown, guides 2070 guide drive belt 2062 to make contact with a greater portion of the circumference of gear 2068. In at least some embodiments, this may improve the engagement of drive belt 2062 with gear 2068 and reduce occurrences of slipping. In some embodiments, drive belt 2062 includes teeth or another surface profile which meshes with the teeth of gear 2068. In one example (not shown), gear 2068 is a sprocket with teeth that meshes with a perforated or chain-link drive belt 2062. This may also improve the engagement of drive belt 2062 with gear 2068 and reduce occurrences of slipping.

In some embodiments, one or both of drive assembly 2064 and drive belt 2062 are substituted by a suitable alternative. In one example (not shown), drive belt 2062 is substituted by a curved rack with which gear 2068, acting as a pinion, engages. In this example, when motor 2066 drives gear 2068 to rotate, gear 2068 travels along the rack and thereby induces power-adjustable support assembly 2004 to travel along guide rail 2042.

Drive assembly 2064 in some embodiments includes one or more sensors (not shown) for tracking the position of drive assembly 2064 relative to frame 2002. In one example, motor 2066 includes a potentiometer which counts the number and direction of rotations of motor 2066 from which a travel distance can be derived. In another example, drive assembly 2064 includes an optical sensor for detecting visual markings applied to drive belt 2062 or frame 2002, which marking are indicative of a position or distance traveled along drive belt 2062 or frame 2002. The output of the sensors may be sent to the workstation controller which directs the movement pattern of the power-adjustable support assembly.

Figure 31:
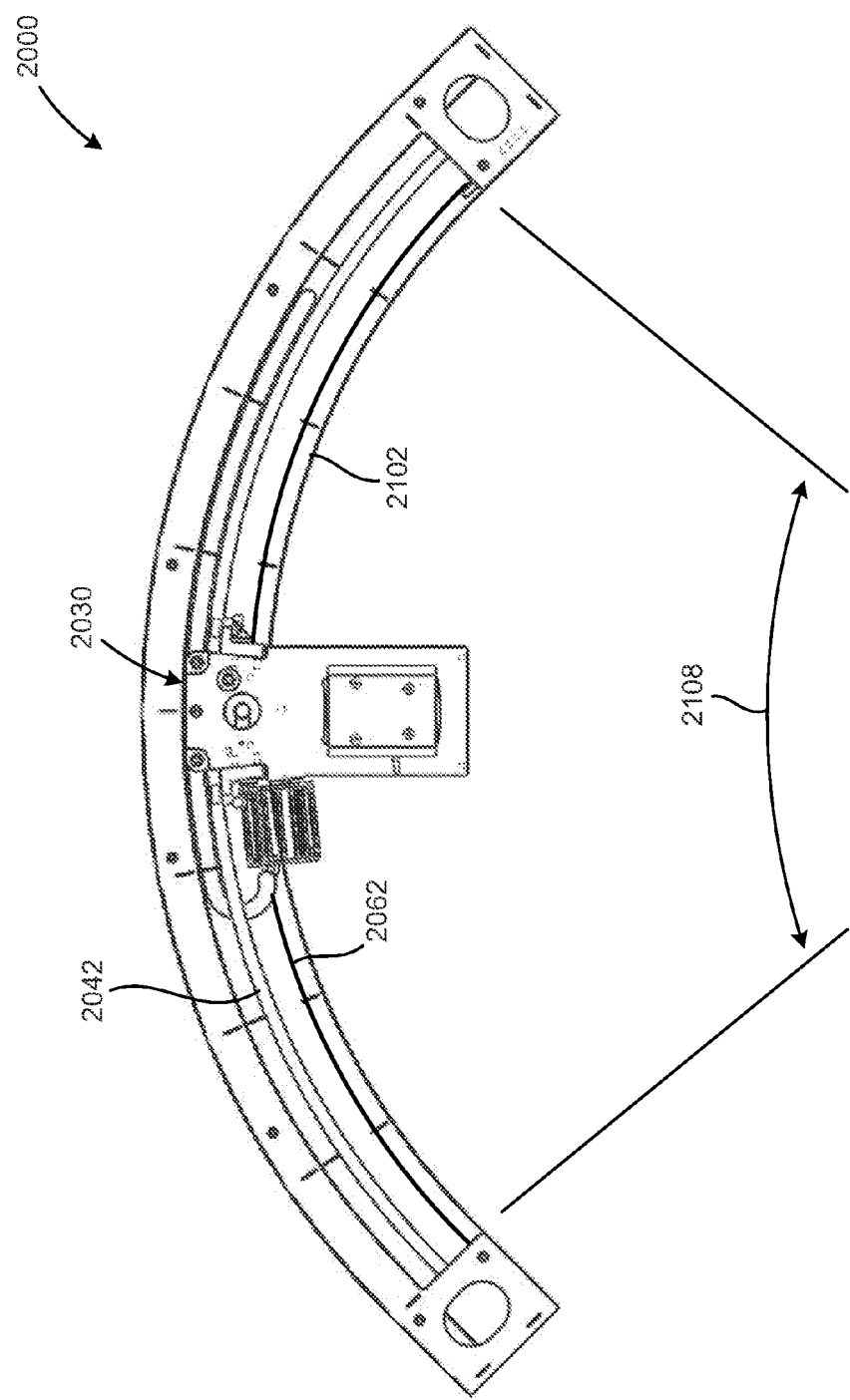
FIG. 31 shows a partial top plan view of the workstation of FIG. 20.

Referring now to FIG. 31, a partial top plan view of workstation 2000, with tabletop assembly 2006 omitted, is shown in accordance with at least one embodiment. In the example shown, guide rail 2042 defines an arcuate path that extends through an angle 2108 of about 90 degrees. In alternative embodiments, guide rail 2042 defines an arcuate path that extends through an angle of between 20 and 180 degrees. The actual angular range of motion traveled by power-adjustable support assembly 2004 along the arcuate path defined by guide rail 2042 is controlled by the workstation controller which operates powered rotator 2030. In some embodiments, an angular range of motion is selected which does not over-stretch the user's thoracic spine and thereby increasing pressure in their lumbar spine and risk of injury. Users with limited flexibility or back-related medical conditions may benefit from ranges of motion of 90 degrees or less. However, in alternative embodiments, an angular range of motion may be selected from between 10 degrees and 270 degrees for example.

As used herein and in the claims the terms "arc", and "arcuate" refer to concave curvatures, each of which may have one or more radii of curvatures and centers of curvature. In some cases, a user may maintain position at a constant distance from tabletop 2010. In these cases, a user rotating their torso to follow the rotation of the tabletop 2010 would most likely do so about the thoracic and cervical spine. In some cases the distance between a user and tabletop 2010 may vary. This may occur by operation of powered depth adjuster 2079, movement of the user, or the relative position of the user to the center of curvature of the arcuate path traveled by power-adjustable support assembly 2004. In any case, following the movement of tabletop 2010 while the distance to tabletop 2010 is changing may require the user to perform additional movements of the hips, lumbar spine and lower extremity. This may result in an increase in movement of several body parts, an increase in muscle contractions and an increase in energy expenditure.

Figure 28A:
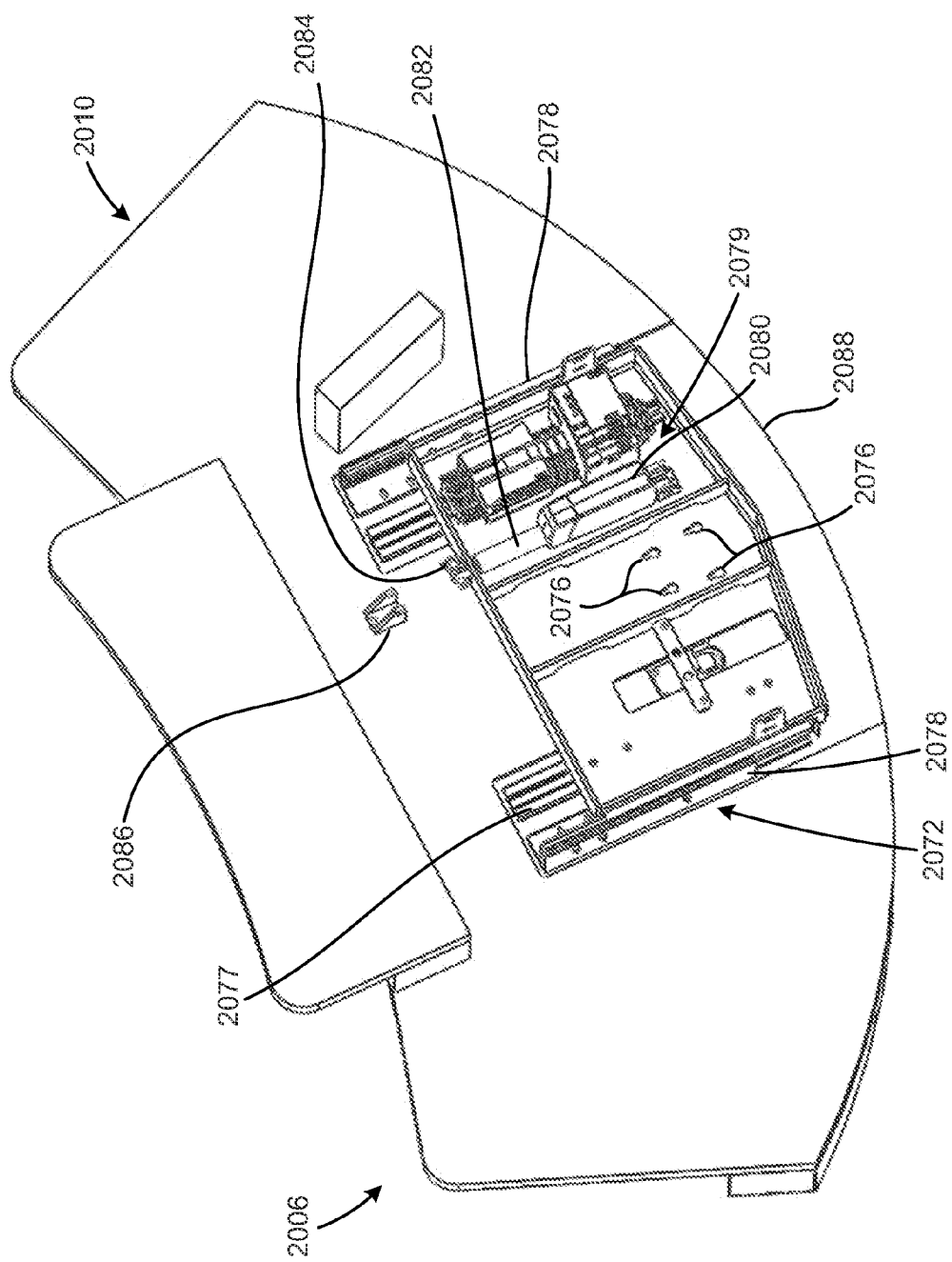
FIG. 28A shows a perspective view of the underside of a tabletop assembly, in accordance with at least one embodiment.

Reference is now made to FIG. 28A which shows a perspective view of the underside of tabletop assembly 2006. In the example shown, tabletop assembly 2006 includes a base 2072 and a tabletop 2010. Base 2072 as shown is configured to secure to powered height adjuster 2014. For example, fasteners 2024 of mounting member 2022 (see FIG. 22) can be received in slots 2076 of base 2072 and then tightened to secure base 2072 to powered height adjuster 2014.

Tabletop 2010 is shown slideably coupled to base 2072 by drawer slides 2078 and 2077. In the illustrated example, tabletop 2010 is slideably coupled to base 2072 by two vertically oriented drawer slides 2078 and one horizontally oriented drawer slide 2077. In at least some embodiments, horizontally oriented drawer slide 2077 provides additional rotational stability. Regardless, in alternative embodiments any number of horizontally oriented and vertically oriented drawer slides is used to slideably connect tabletop 2010 to base 2072. In one example, tabletop assembly 2006 includes two vertically oriented drawer slides 2078, and no horizontally oriented drawer slides 2077.

In some embodiments, tabletop assembly 2006 is coupled to base 2072 by a different coupling other than drawer slides, which permits relative horizontal movement between tabletop 2010 and base 2072. In one example (not shown), a pair of spaced apart cylindrical rails is secured to tabletop 2010, and base 2072 includes sleeves for slideably coupling base 2072 to the cylindrical rails.

Base 2072 as shown includes a powered depth adjuster 2079. In at least some embodiments, powered depth adjuster 2079 is operable to move tabletop 2010 horizontally relative to base 2072. In the example shown, powered depth adjuster includes a linear actuator 2080 which is operable to extend and retract a shaft 2082. The end of shaft 2082 is shown fitted with a fastener 2084 for connecting shaft 2082 to a bracket 2086 of tabletop 2010. As shown, actuator 2080 is aligned to extend and retract shaft 2082 parallel to drawer slides 2078 and 2077. In operation, actuator 2080 as shown can selectively extend and retract shaft 2082, to urge tabletop 2010 to move horizontally relative to base 2072. In at least some embodiments, actuator 2080 and drawer slides 2078 and 2077 are oriented so that tabletop 2010 can move horizontally relative to base 2072 in a direction generally perpendicular to the current position along the arcuate path defined by guide rail 2042. This direction may generally correspond with the center of curvature of the arcuate path at the position of power-adjustable support assembly 2004 along the arcuate path.

In alternative embodiments, powered depth adjuster 2079 operates by a mechanism other than linear actuator 2080. In one example (not shown), tabletop 2010 includes a rack, and powered depth adjuster 2079 includes a motor driven pinion connected to base 2072 and meshed with the rack. In this example, motor-driven rotation of the pinion causes the pinion to travel along the rack and therefore tabletop 2010 to move horizontally relative to base 2072.

In FIG. 28A, shaft 2082 is shown disconnected from bracket 2086. In this configuration, base 2072 can slide by drawer slides 2078 beyond rear edge 2088 of tabletop 2010. This may provide access to tighten fasteners 2024 (FIG. 22) which are received by slots 2076. Subsequently, base 2072 can be slid back under tabletop 2010, and shaft 2082 can be connected by fastener 2084 to bracket 2086 of tabletop 2010.

Figure 28B:
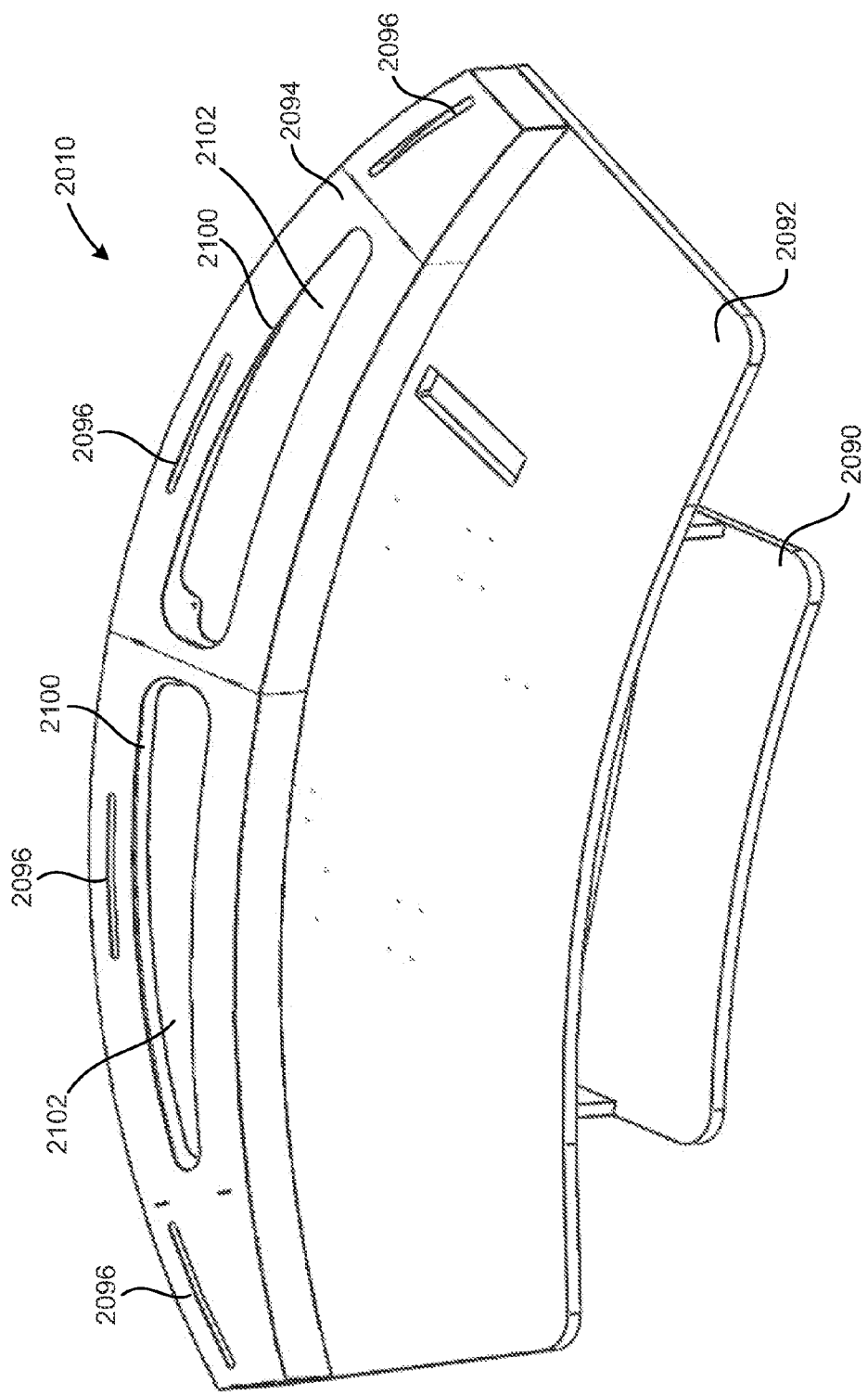
FIG. 28B shows another perspective view of the tabletop of FIG. 28A, in accordance with at least one embodiment.

Referring now to FIG. 28B, a perspective view of tabletop 2010 is shown in accordance with at least one embodiment. In the example shown, tabletop 2010 includes a keyboard tray 2090, a work surface 2092, and an elevated platform 2094. Platform 2094 as shown includes a plurality of mounting slots 2096 for mounting support posts for monitors and the like. For example, FIG. 20 shows four support posts 2098, each support post 2098 mounted in a mounting slot 2096. In the example shown, platform 2094 further includes two access ports 2100 which provide access to an internal cavity 2102 beneath platform 2094. Cavity 2102 may provide a passage for cables directed to devices on tabletop 2010, such as telephones and monitors for example. In alternative embodiments, platform 2094 may include fewer or greater than two access ports 2100. In one example, platform 2094 includes four access ports 2100. In at least some embodiments, tabletop 2010 includes a removable cover for at least one of the access ports 2100.

Figure 29:
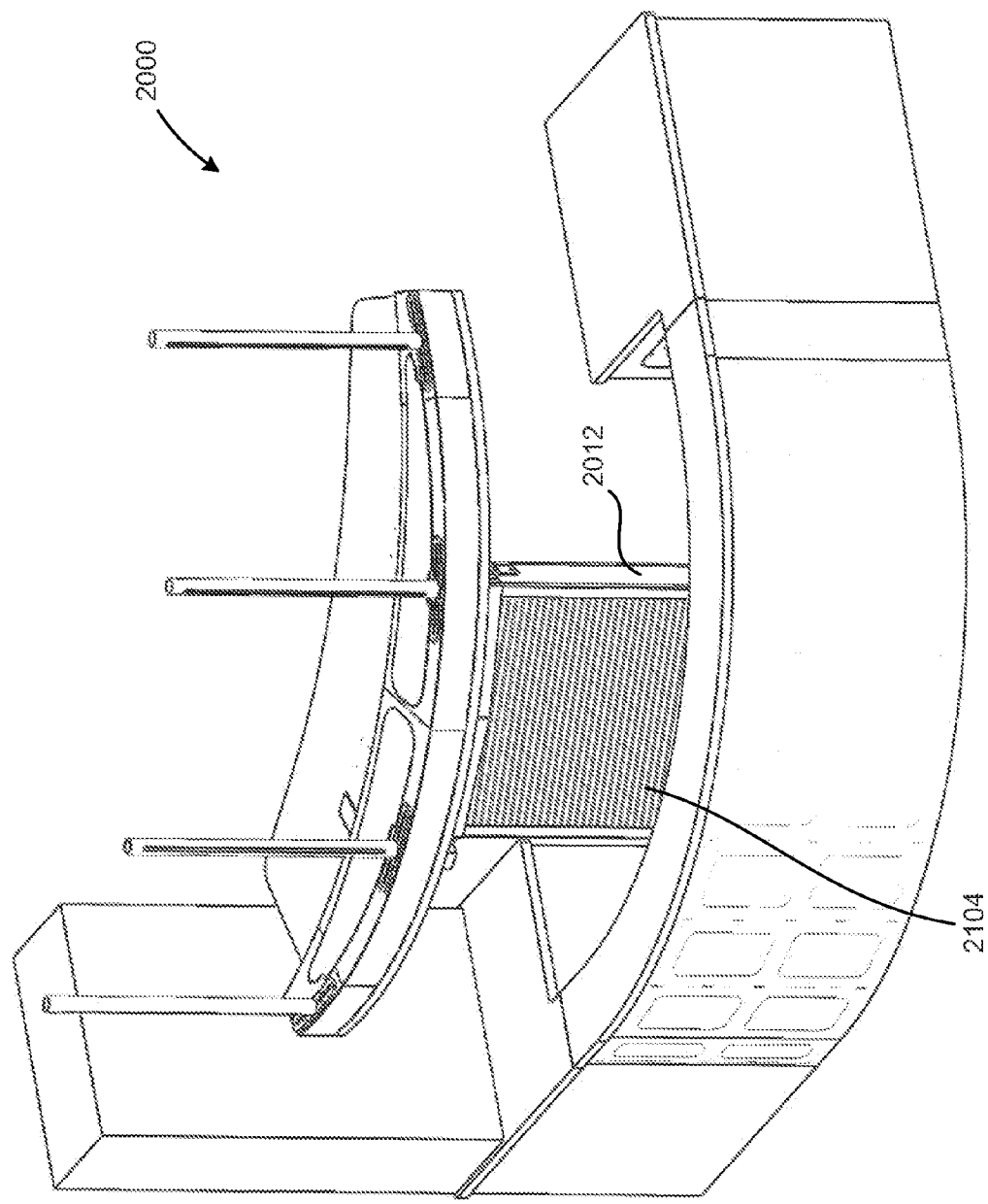
FIG. 29 shows a rear perspective view of the workstation of FIG. 20.
Figure 30:
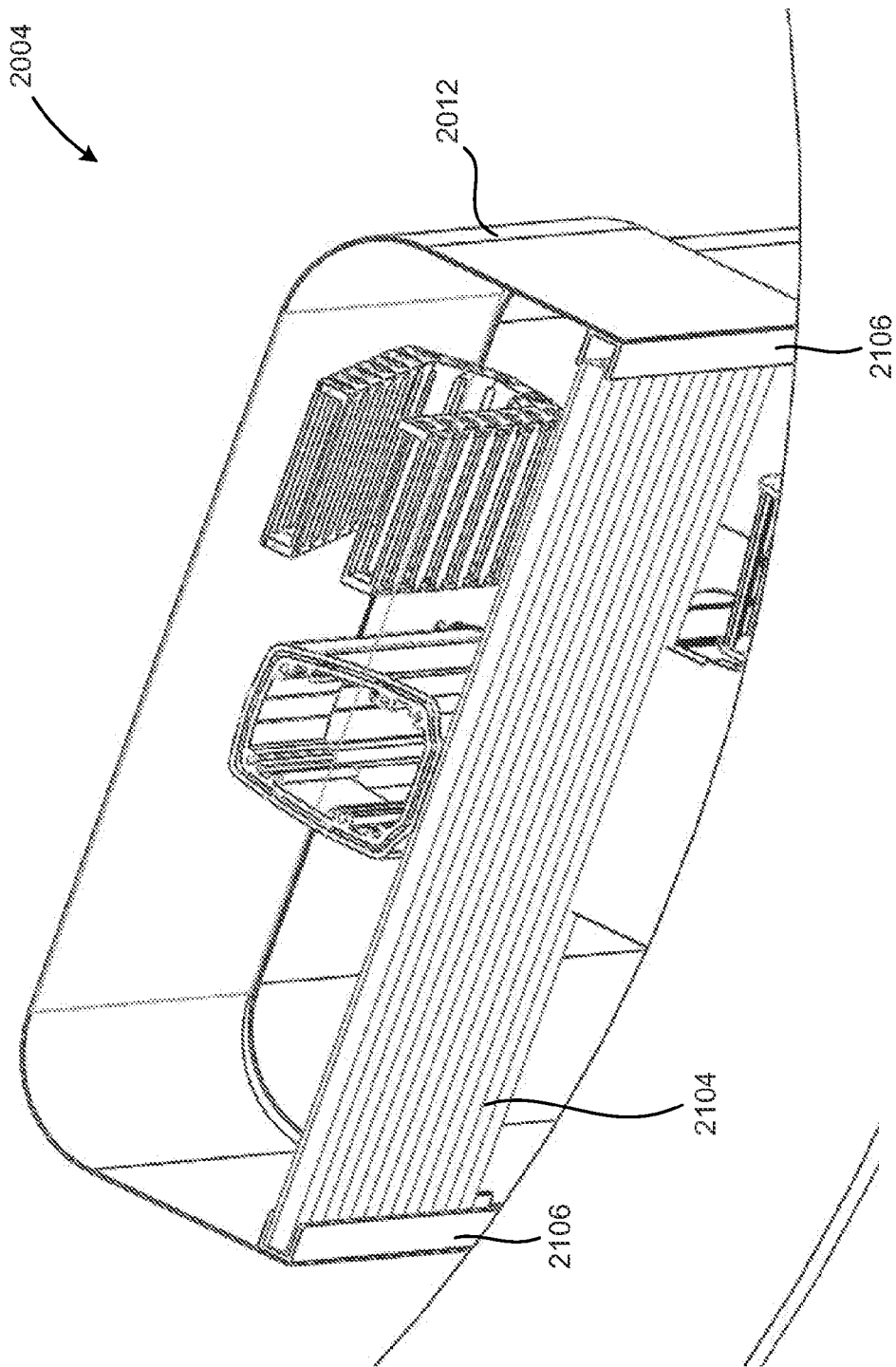
FIG. 30 shows a partial cut-away perspective view of the workstation of FIG. 29.

Reference is now made to FIGS. 29 and 30. FIG. 29 shows a rear perspective view of workstation 2000. FIG. 30 shows a partial cut-away perspective view of workstation 2000. In the example shown, power-adjustable support assembly 2004 includes a telescoping cover 2012 for hiding the internal elements of power-adjustable support assembly 2004 from a front view of workstation 2000. Power-adjustable support assembly 2004 as shown also includes extensible cover 2104 for hiding the internal elements of power-adjustable support assembly 2004 from a rear view of workstation 2000. As shown, extensible cover 2104 is mounted to the rear of support assembly 2004 and extends between two upright C-shaped brackets 2106. An upper portion of extensible cover 2104 (obscured from view) may be coupled to tabletop assembly 2006 or telescoping cover 2012. In operation, as tabletop assembly 2006 is moved vertically by powered height adjuster 2014, the upper portions of extensible cover 2104 and telescoping cover 2012 move vertically therewith thereby expanding or contracting extensible cover 2104 and telescoping cover 2012 so that the internal elements of power-adjustable support assembly 2004 remain hidden from view.

In the example shown, extensible cover 2104 is a bellows, which is oriented to be vertically extensible and contractible in response to height adjustments to tabletop assembly 2006. In alternative embodiments, extensible cover 2104 has a different structure, such as a sheet of elastic fabric. Telescoping cover 2012 is shown including a plurality of rigid panels which nest when contracted. In alternative embodiments telescoping cover 2012 includes a sheet of elastic fabric or other extensible covering (not shown).

Numerous types of cables may be directed to devices on tabletop 2010, such as power cables, network cables, data cables, video cables, and audio cables for example.

In many cases, the source of these cables is a stationary element, such as for example a computer or printer located in furniture 2008, or power outlets located in a floor or wall plate. In these cases, as tabletop 2010 moves (e.g. vertically, and/or horizontally) the distance between the cable source and the target device on tabletop 2010 may change. Accordingly, in some embodiments, cables directed to devices on tabletop 2010 are sized to accommodate the furthest possible position of tabletop 2010 from the cable source(s). In these embodiments, when tabletop 2010 moves to a position less distant than the furthest possible position, there will be an excess length of cable ("cable slack"). Accordingly, in at least some embodiments workstation 2000 includes a cable management system for managing cable slack, which may otherwise tangle and possibly interfere with the operation of power-adjustable support assembly 2004 or tabletop assembly 2006.

Referring now to FIGS. 21 and 22, workstation 2000 is shown including a cable management system 2110, in accordance with at least one embodiment. Cable management system 2110 as shown includes a vertical flexible conduit 2112 and a horizontal flexible conduit 2114. Conduits 2112 and 2114 provide a defined passage for cables directed to tabletop 2010. Conduits 2112 and 2114 also manage the cable slack that can develop when tabletop 2010 moves between various positions.

In the example shown, vertical flexible conduit 2112 includes a first flexible conduit segment 2112*a*, and a second flexible conduit segment 2112*b*. In use, first and second flexible conduit segments 2112*a* and 2112*b* are connected by their respective ends 2116*a* and 2116*b* to form a unified vertical flexible conduit 2112. The separability of vertical flexible conduit 2112 into first and second flexible conduit segments 2112*a* and 2112*b* may provide an installation convenience and access for feeding new cables through vertical flexible conduit 2112. In alternative embodiments, vertical flexible conduit 2112 is not separable into segments.

Vertical flexible conduit 2112 includes a first end 2118, and a second end 2120. As shown, first end 2118 is connected to powered height adjuster 2014 promixate to mounting member 2022 of tabletop assembly 2006. First end 2118 provides an exit for cables directed to tabletop 2010. Second end 2120 of vertical flexible conduit 2112 provides an entrance for cables exiting horizontal flexible conduit 2114. Flexible conduit 2112, as shown, has a length which accommodates the maximum height of powered height adjuster 2014. When powered height adjuster 2014 is set to below its maximum height, flexible conduit 2112 forms an auxiliary loop which accommodates the excess cable slack. This may prevent the cables from becoming entangled and/or interfering with the movements of workstation 2000 when cable slack develops.

Horizontal flexible conduit 2114 includes a first end 2122, and a second end 2124. As shown, first end 2122 of horizontal flexible conduit 2114 is connected to second end 2120 of vertical flexible conduit 2112. First end 2122 provides an exit for cables directed to vertical flexible conduit 2112. Second end 2124 is shown connected to frame 2002 and provides an entrance for cables originating from a cable source. Although second end 2124 may be connected at any position along frame 2002, in many cases second end 2124 is connected to frame 2002 at a position proximate one of furniture 2008 where a computer or printer might be located for example.

Horizontal flexible conduit 2114 as shown is horizontally oriented and located in an interior cavity of frame 2002. In the example shown, flexible conduit 2114 has a length which accommodates the maximum horizontal path distance between second end 2124 of horizontal flexible conduit 2114 and second end 2120 of vertical flexible conduit 2112. This maximum horizontal path distance normally corresponds to a position of power-adjustable support assembly 2004 at one end of the arcuate path defined by guide rail 2042. In operation, second end 2124 of horizontal flexible conduit 2114 follows power-adjustable support assembly 2004 as it travels along guide rail 2042. When the horizontal path distance mentioned above is less than the maximum horizontal path distance, horizontal flexible conduit 2114 forms an auxiliary horizontal loop which accommodates excess cable slack. This may prevent the cables from becoming entangled and/or interfering with the movements of workstation 2000.

In the example shown, flexible conduits 2112 and 2114 are composed of a chain of pivotally connected conduit links (horizontal flexible conduit 2114 is illustrated more simplistically for clarity of illustration). This composition may provide flexible conduits 2112 and 2114 with a strength and durability to withstand frequent articulation. In alternative embodiments, one or both of flexible conduits 2112 and 2114 has another structure, such as a flexible hose.

Figure 16:
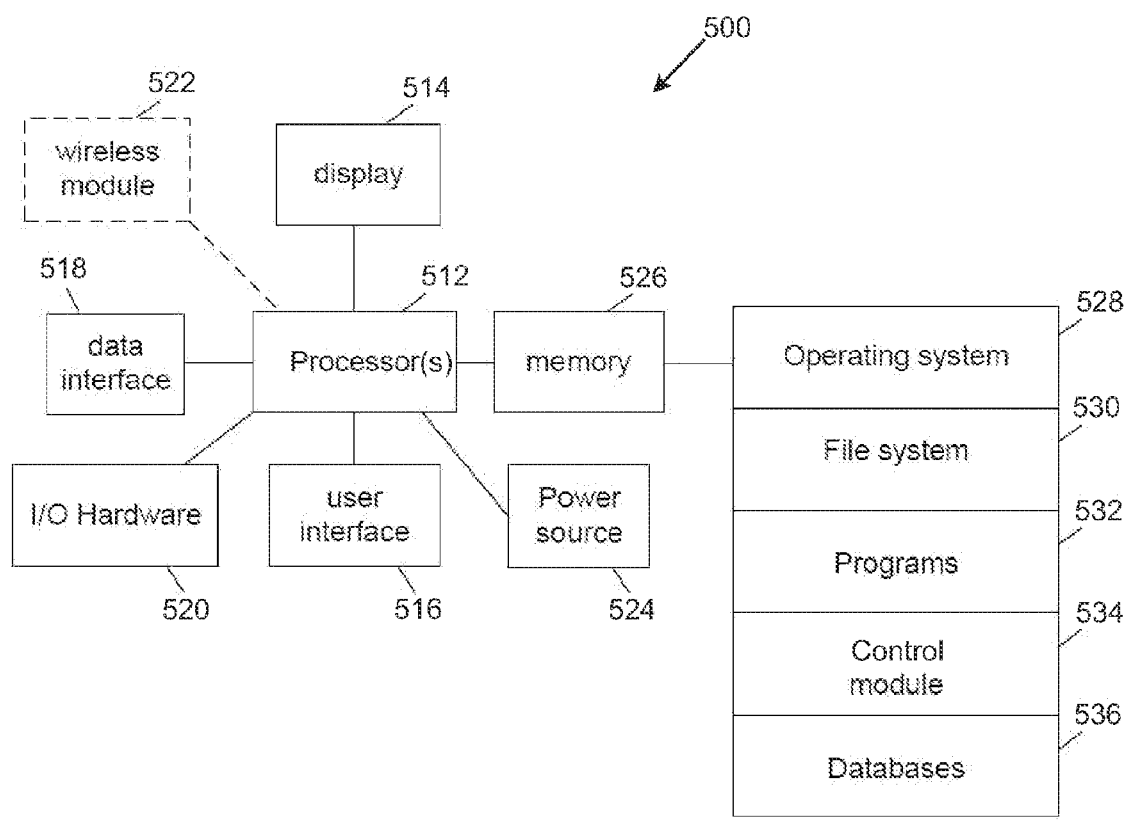
FIG. 16 shows a schematic of a controller in accordance with at least one embodiment.

FIG. 16 shows a block-diagram of a controller 500 in accordance with at least one embodiment. Controller 500 is electrically connected, which may be done via a wired or wireless connection depending on the embodiment, to one or more of a powered depth adjuster (e.g. powered depth adjuster 254 or 2079), a powered height adjuster (e.g. powered height adjuster 106 or 2014) and a powered rotator (e.g. powered rotator 136 or 2030) for controlling these elements. During operation, the controller 500 sends control signals to one or more of the powered depth adjuster, powered height adjuster and powered rotator to achieve certain movements of the tabletop (e.g. tabletop 250 or 2010) with respect to the user position according to the predefined parameters of the user profile associated with the user that is using the workstation (e.g. workstation 100 or 2000). The predefined parameters include at least one of periodicity, speed and range of motion for the tabletop of the workstation.

In the example shown, controller 500 includes at least one processor 512, a display 514, a user interface 516, a data interface 518, Input/Output (I/O) hardware 520, a wireless module 522, a power source 524 and a memory 526. Memory 526 includes software code for implementing one or more of an operating system 528, a file system 530, various programs 532, and a database 536. In at least one embodiment, controller 500 can be a dedicated hardware device with associated software and firmware that is configured to control the powered depth adjuster, powered height adjuster, and powered rotator, as described herein. In alternative embodiments, controller 500 can be a desktop computer, a laptop, a mobile device, a smart phone, a cell phone, a tablet, a personal digital assistant, and the like.

Processor(s) 512 controls the operation of the controller 500 and can be any suitable processor depending on the configuration of the controller. Display 514 can be any suitable display that provides visual information depending on the configuration of the controller. For instance, display 514 can be a cathode ray tube monitor, a flat-screen monitor and the like if controller 500 is a computer. In other cases, display 514 can be a display suitable for a laptop, tablet or handheld device such as an LCD-based display and the like. In at least one embodiment, controller 500 may not include a display 514.

User interface 516 can include one or more of a mouse, a keyboard, a touch screen, a thumbwheel, a track-pad, a trackball, a card-reader, voice recognition software and the like again depending on the particular implementation of controller 500. In some cases, some of these components can be integrated with one another. In at least one embodiment, controller 500 may not include a user interface 516.

The data interface 518 can be any interface that allows the controller 500 to communicate with other devices or computers. In some cases, data interface 518 can include at least one of a serial port, a parallel port or a USB port that provides USB connectivity. Data interface 518 can also include at least one of an Internet or local area network connection through an Ethernet, Firewire or modem connection or through a digital subscriber line. Various combinations of these elements can be incorporated within data interface 518.

The data interface 518 also includes elements to allow the controller 500 to communicate with the actuators such as at least one Digital to Analog converter (DAC) and at least one Analog to Digital converter (ADC). This communication includes sending control signals from the controller 500 to the actuators to move the tabletop in a certain dimension at a predefined speed and periodicity of movement. In some embodiments, the controller 500 may also receive information from the actuators or the tabletop such as position and speed information to keep track of the tabletop position as it is moved.

I/O hardware 520 can include one or more of a speaker, a card scanner, a camera and a printer, for example. In at least one embodiment, controller 500 may not include I/O hardware 520. Wireless module 522 is optional and can be a radio that communicates utilizing the CDMA, GSM, GPRS or Bluetooth protocol according to standards such as IEEE 802.11a, 802.11b, 802.11g or 802.11n for example. Power source 524 can be any suitable power source that provides power to controller 500 as well as to the actuators and may be a power adaptor or a rechargeable battery pack depending on the implementation of controller 500.

Memory 526 can include RAM and flash memory elements as well as other storage elements such as disk drives and hard drives. Memory 526 is used to store one or more of operating system 528, file system 530 and programs 532. For instance, operating system 528 and file system 530 may provide various basic operational processes for controller 500.

Memory 526 may also store a control module 534. Control module 534 can control the operation of the powered depth adjuster, powered height adjuster and powered rotator based on user information received via data interface 518 for example.

Memory 526 may also store one or more databases 536. Databases 536 can be used to store user profile data for one or more users. Databases 536 can also store other information required for the operation of programs 532 or operating system 528 such as dynamically linked libraries and the like.

Controller 500 may include one or more user interface and processor(s) 512 may communicate with one or more of these user interfaces to receive a user profile for a user. This can be through user interface 516, data interface 518 or wireless module 522. For instance, the user profile can be inputted by someone through user interface 516 or it can be received through data interface 518 from a user memory device (e.g. a USB storage device).

In at least one embodiment, controller 500 can be a computer that acts as a web server and provides content for a web site. One of the webpages on the website can be a webpage for configuring a user profile as described herein. In this case, a user can interact with the webpage to directly enter the information required for the processor to generate and store the user profile. The user can interact with the web server and provide the required information using a desktop computer, a laptop, a tablet, a smart phone or any other suitable electronic device.

In at least one embodiment, controller 500 may be remotely controlled and/or configured (e.g. by another computer, desktop, laptop, smartphone, or tablet).

Figure 17:
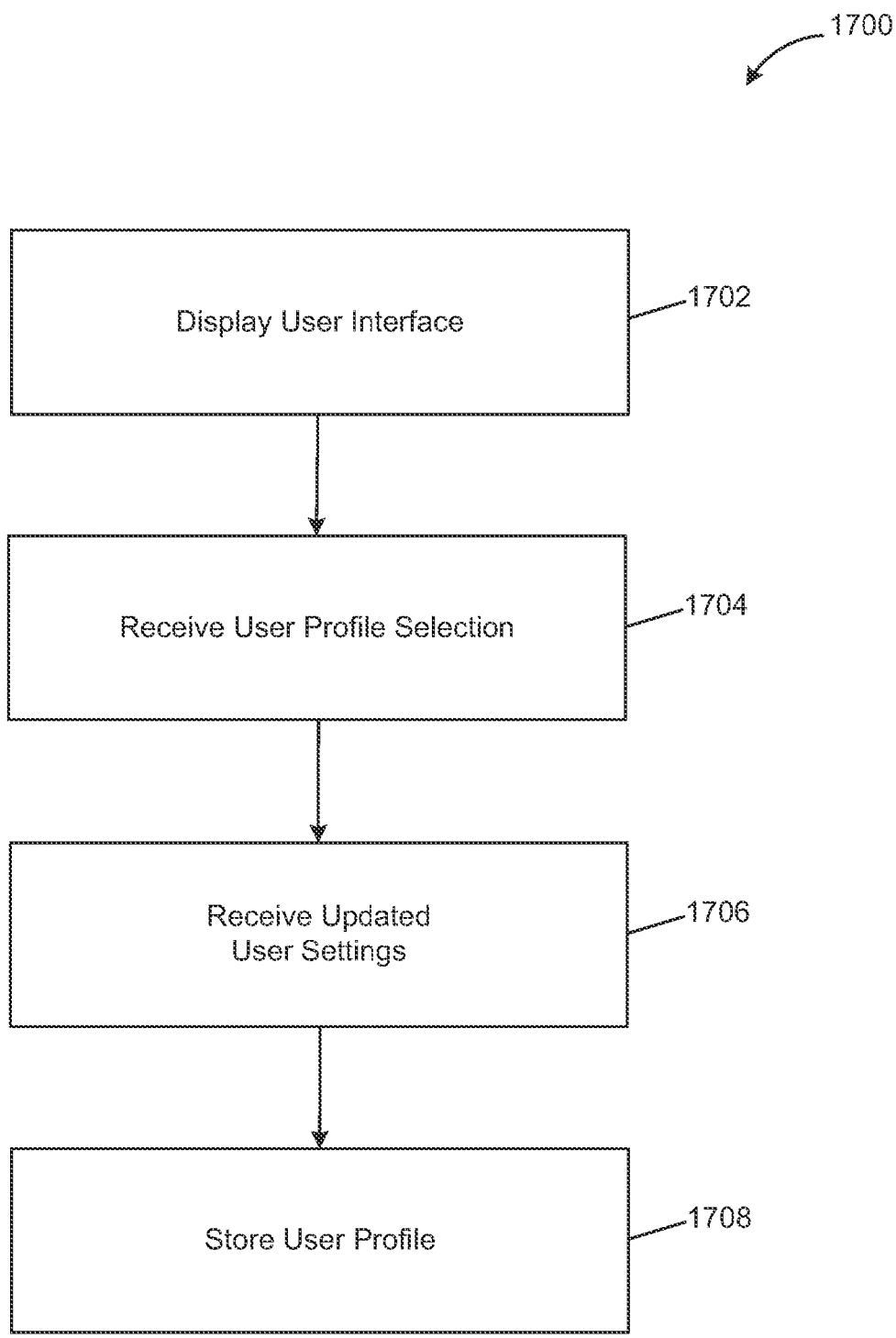
FIG. 17 shows a flowchart illustrating the steps of a method for configuring user settings in accordance with at least one embodiment.

FIG. 17 shows a flowchart illustrating the steps of a method 1700 for configuring user settings in accordance with at least one embodiment. A computing device such as controller 500, or another computing device (e.g. a remote server computer, or an administrator's desktop computer) having features similar to those described above with respect to controller 500 may perform method 1700.

At 1702, a user interface display is displayed on a display (e.g. display 514) of the computing device. The user interface display may correspond with software (e.g. programs 532) stored on a memory (e.g. memory 526) of the computing device. In at least one embodiment, the user interface may correspond with a website accessed through a data interface (e.g. data interface 518) and/or a wireless module (e.g. wireless module 522). In at least one embodiment, the user interface display may update to convey information to or request information from a user.

In at least one embodiment, the user interface display may display a prompt for credentials, such as, for example, a login and password, a biometric credential (e.g. fingerprint or facial image), a Personal Identification Number (PIN), or combinations thereof. The credentials may verify the identity of the user accessing the computing device. If the user's identity is verified and if the user has permissions to edit user settings, the method may proceed to 1704. Optionally, permission to edit user settings may be exclusive to an administrator (e.g. an office manager).

At 1704, the computing device receives a user profile selection. The user profile selection may include a request to make a new profile or a selection of an existing profile.

In at least one embodiment, the user interface display may display a prompt for a user profile selection. The prompt may include a list of user profiles stored in a memory (e.g. in database 536 of memory 526) of the computing device or stored elsewhere.

In some embodiments, receiving a user profile selection may include reading a user device using a user device reader. A user device may be any mobile device that can store or be used to identify a particular user profile. For example, a user device may be a user ID card that includes a user ID encoded onto a magnetic strip. The user ID can be used to identify a user profile corresponding to that user ID. In this case, the user device reader may be a card reader. In another example, a user device may be a user memory device (e.g. a USB memory key or a memory card) that can store a user profile. In this case, the user device reader may be a USB interface along with a processor, or memory card reader.

In at least one embodiment, the user interface display may display a prompt requesting a user profile ID (e.g. a name or a number). The user profile ID may correspond to a user profile stored in the memory of the computing device or stored elsewhere. In at least one embodiment, receiving a user profile selection may include reading data from a user ID card (e.g. via a card scanner of I/O hardware 520). The data from the user ID card may correspond to a specific user profile, so that the computing device can interpret the data as a user profile selection.

In at least one embodiment, receiving a user profile selection may include detecting the insertion of a user memory device (e.g. a USB storage key, or a memory card such as an SD card, or a compact flash card for example) and identifying a user profile stored on the user memory device or the lack thereof. If a user profile is stored on the user memory device, then the computing device may receive the selection of that user profile upon insertion of the user memory device. If a user profile is not stored on the user memory device, then the computing device may receive a selection for a new user profile upon insertion of the user memory device.

Generally, a user profile may include a plurality of user settings. The user settings may be specific to the user to whom the user profile corresponds. In at least one embodiment, the user profile may include one or more of anthropometric measures, physiological and demographic information, and workstation positions and measures.

Anthropometric measures may include, for example, a seat height of a chair if applicable (e.g. chair 166), a user's sitting and standing elbow height, and a user's eye height (all when wearing usual footwear), minimum and maximum horizontal depth positions of the tabletop (e.g. as controlled by the powered depth adjuster), and the maximum angular rotation of tabletop 2010 about the arcuate path in clockwise and counterclockwise directions for each of the seated and standing positions (e.g. as controlled by the powered rotator). In at least one embodiment, some of the anthropometric measures may be calculated using body measurements (e.g. forearm length, knee height, etc).

The anthropometric measures may also include a frequency of movement (e.g. "active", "moderately active", "somewhat active", or "personalized") corresponding to a periodicity of movement. For example, a workstation configured to an "active" frequency of movement may rotate and change height more frequently (and possibly more quickly) than a workstation configured to a "somewhat active" frequency of movement. In at least one embodiment, there may be a "personalized" frequency of movement, wherein the periodicity of vertical movement (e.g. by the powered height adjuster) and the periodicity of rotational movement (e.g. by the powered rotator) may be specified independently. Furthermore, a user profile may include custom variable periodicity of movement patterns such as a standing duration and a separate seating duration before transitioning to the other may as part of a personalized frequency of movement.

In at least one embodiment, a user profile may include physical, demographic and physiological information which may be useful for determining a user's energy expenditure and for fine tuning the operational parameters of the workstation. The physical, demographic and physiological information may include one or more of height, weight, age, gender, blood pressure, glucose values, cholesterol level, and an activity level.

In at least one embodiment, this information may be used to determine the individual's overall health and to set the default speed and frequency preferences. In at least one embodiment, this information may be collected regularly to track and present a user's progress on display 514.

In at least one embodiment, a user profile may include workstation positions and measures such as elbow height when standing when wearing usual footwear and seated, and a horizontal depth position of the tabletop in the seated and standing positions (e.g. to maintain the user's upper arms in a relaxed position hanging down from the shoulders).

At 1706, the computing device may receive updated user settings. For example, the user interface display may update to prompt for one or more of the anthropometric measures, physiological and demographic information or workstation positions and measures described above. In at least one embodiment, the computing device may display (e.g. on a display 514) text, images, audio or other multimedia content to provide instructions on how to determine or measure the information for the user profile. For example, the computing device may display instructions that the chair height should be measured while a seated user's thighs are approximately level with the floor while wearing usual footwear.

At 1708, the computing device may store the user profile including the updated user settings. In at least one embodiment, the computing device may store the user profile in response to input from an input device (e.g. user interface 516) such as a keyboard, mouse, or touchscreen.

In the case of an existing user profile, storing the user profile may include overwriting or updating the existing user profile. In the case of a new user profile, storing the user profile may include storing the new user profile. In at least one embodiment, storing the user profile may include copying the user profile to a user memory device. In at least one embodiment, storing the user profile may include copying the user profile to or updating a user profile on a memory of the computing device, or a remote memory (e.g. a memory 526 of a controller 500 of the workstation, or a memory of a remote server computer).

Figure 18:
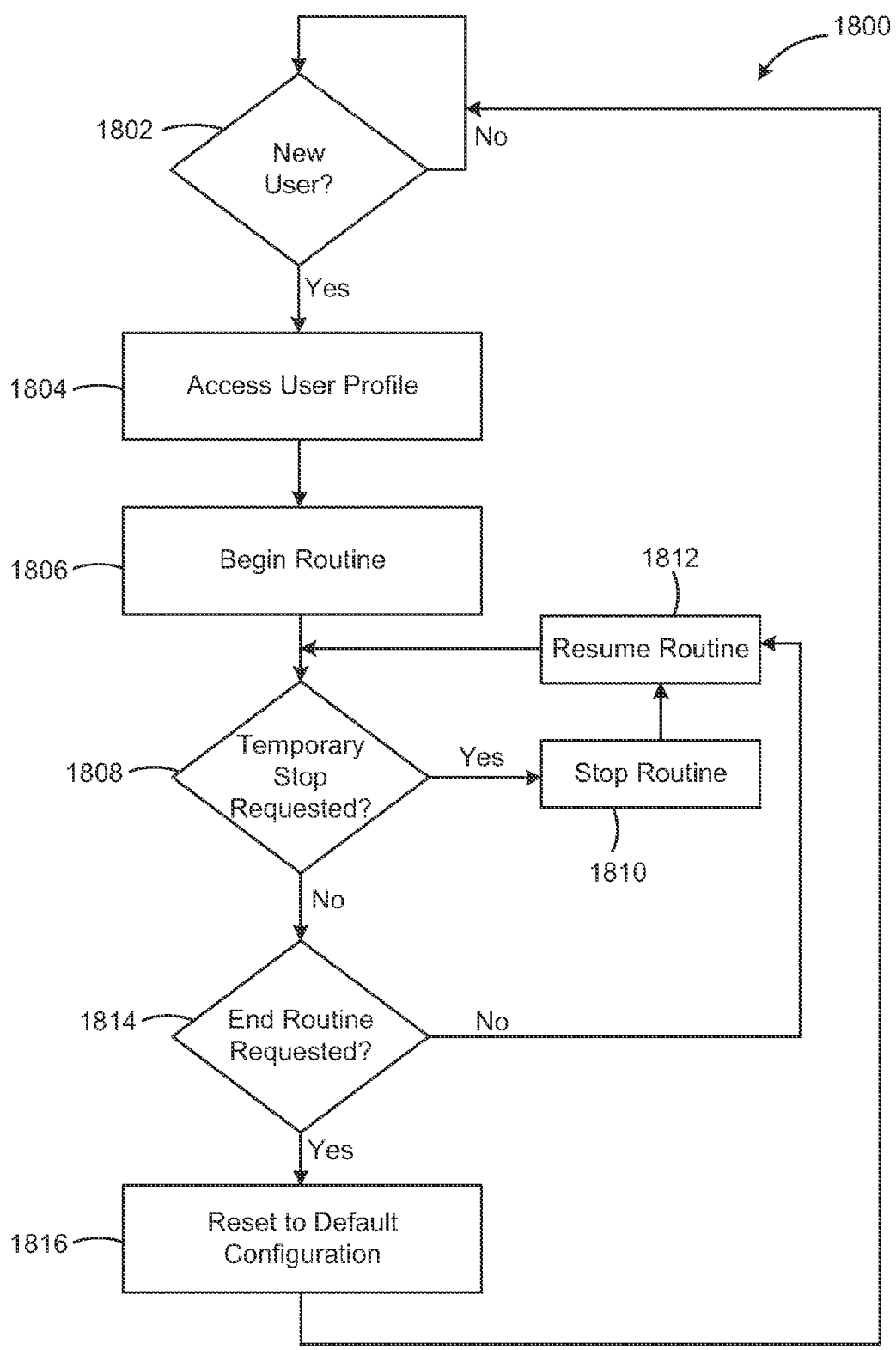
FIG. 18 shows a flowchart illustrating the steps of a method for operating a workstation in accordance with at least one embodiment.

FIG. 18 shows a flowchart illustrating the steps of a method 1800 for operating the workstation in accordance with at least one embodiment. Although method 1800 is described with reference to controller 500, another computing device (e.g. a remote server computer, or an administrator's desktop computer) having features similar to those described above with respect to controller 500 may perform method 1800.

At 1802, controller 500 may monitor for a new user. In some embodiments, controller 500 may detect a connection to a user device (e.g. a USB memory key, a user ID card, or a wireless data connection). For example, controller 500 may detect whether a user memory device (e.g. a USB memory key or a memory card) has been connected to controller 500 by a data interface 518 (e.g. a USB port or a memory card reader). In another example, controller 500 may detect whether a card scanner 520 has read data from a user ID card (e.g. a card having data encoded in a barcode, a magnetic strip or a wirelessly accessible memory). In another example, controller 500 may detect whether an electronic device (e.g. a computer) has connected to controller 500 by a wireless module 522 (e.g. upon signing onto software on the computer).

In at least one embodiment, controller 500 may detect input of an ID (e.g. a name, number or alphanumeric string) into a user interface device 516 (e.g. a keyboard or keypad). In another example, controller 500 may recognize the face of a user in a camera 520 or the voice of a user in a microphone 520.

If a new user is not detected at 1802, controller 500 may continue to wait for a positive detection. If a new user is detected at 1802, controller 500 may automatically access the user profile corresponding to the new user, to operate the workstation according to the user settings within. For example, when controller 500 detects a new user (e.g. when a user connects a user memory device to controller 500), controller 500 may automatically retrieve the user profile and begin operating the workstation according to the user settings. This may minimize the actions required for a new user to start a workstation (e.g. they may only need to insert their user memory device).

The user profile corresponding to the new user may be stored on the user memory device connected to controller 500, on a memory of controller 500, or on a remote memory (e.g. of a server or office manager's computer). In the case of a user profile stored on a remote memory, controller 500 may access the remote memory over a network using a data interface 518 and/or a wireless module 522.

In some embodiments, controller 500 may copy the user profile to a database 536 in memory 526 of controller 500. In some embodiments, controller 500 may read the user profile from its storage location (e.g. on the user memory device, or on a remote memory of a server or office manager's computer).

At 1806, controller 500 may begin operating the workstation according to a routine based upon the user settings of the user profile. Generally, controller 500 may operate one of more of the powered height adjuster, powered depth adjuster and powered rotator in an ergonomic pattern of speed and range of motion, with speeds and ranges of motion that are predefined for the user, at least in part, in the user profile.

In at least one embodiment, controller 500 may operate one or more of the powered height adjuster, powered depth adjuster and powered rotator intermittently according to a periodicity of movement (e.g. which may correspond to a user's profile settings). For example, operating the powered adjusters at a period of 20 minutes (i.e. with 20 minute pauses between movements) may provide a user with 20 minutes in a stable posture before the workstation changes position.

In at least one embodiment, a periodicity of movement of 20 minutes may impart a desirably reduced muscular cyclical activity. However, in alternative embodiments, controller 500 may operate powered adjusters with a periodicity of movement of between 1 minute and 1 hour, for example. Furthermore, controller 500 may operate each powered adjuster at different periodicities of movement, such that one or more of the powered adjusters may be activated while others of the powered adjusters are paused.

In at least one embodiment, controller 500 may operate one or more powered adjuster at a variable periodicity of movement which changes over the course of a user's session with the workstation. For example, controller 500 may operate the powered adjusters more frequently during times of day when users normally feel tired (e.g. 10 am-12 pm and 2 pm-3 pm).

In at least one embodiment, controller 500 may begin by operating the powered height adjuster to raise the tabletop assembly (e.g. tabletop assembly 102 or 2006) to a seated height based upon the user's elbow height in the seated position in the user settings. Controller 500 may also operate the powered depth adjuster to move the tabletop to a horizontal depth position for a seated position based upon the seated horizontal depth position in the user settings.

Controller 500 may continuously or intermittently operate the powered rotator to move clockwise and counterclockwise along the arcuate path at a speed, periodicity and range based upon the actuation speed, periodicity of movement and the rotation range of motion that is specified in the user settings. For example, controller 500 may operate the powered rotator to rotate or travel along angular positions of the arcuate path at between 10 and 540 degrees per minute, across an arcuate range of between 10 and 270 degrees, and at a periodicity of movement of 20 minutes (e.g. with 20 minute pauses between sequential rotations).

In one example, controller 500 may be configured to gradually increase the range, and speed for a user (e.g. a rehab patient) over the course of many days according to the user's tolerances. Controller 500 may receive a user's tolerance measures through user interface 516, data interface 518 or wireless module 522, for example. In at least one embodiment, a user's tolerance measure may be reflected in the user's settings of the user's profile.

In at least one embodiment, controller 500 may be configured to gradually increase range, and speed for a user over the course of many days according to a rehabilitation schedule. A user (or their doctor, for example) may input the rehabilitation schedule through user interface 516, data interface 518 or wireless module 522, for example.

In at least one embodiment, controller 500 may store the rehabilitation schedule in memory 526. The rehabilitation schedule may indicate the speed, range and/or periodicity for a user, by day or session for example. Accordingly, the controller 500 may determine one or more of the speed, range and/or periodicity of movement for one or more of the powered adjusters by reference to the rehabilitation schedule and the current date or session.

Controller 500 may also continuously or intermittently operate the powered height adjuster to alternate the position of the tabletop assembly between a first height (e.g. a seated height) and a second height (e.g. standing height), based upon the periodicity of movement, speed, and height settings in the user settings. For example, controller 500 may operate the powered height adjuster to raise the height of the tabletop assembly after 10 minutes of sitting, and to lower the tabletop assembly after 20 minutes of standing. Alternatively, controller 500 may operate the powered height adjuster to raise the height of the tabletop assembly soon after it is at a seated height, and to the lower tabletop assembly soon after it reaches standing height. Other periodicities of movement may also be used.

In at least one embodiment, controller 500 may operate the height adjuster to adjust the height of the tabletop assembly to correspond to the natural speed the user stands up and sits down. This may permit a user to more naturally stand and sit, and continue working while the table changes height. In some cases, controller 500 may operate the height adjuster to raise or lower the tabletop assembly at a variable speed which closely matches the natural standing and seating speed of a user. In some cases, controller 500 may operate the height adjuster to raise or lower the tabletop assembly at a uniform speed which approximates the standing or seating speed of a user (e.g. an average speed). The height adjustment speed(s) may be based upon the user settings.

In at least one embodiment, controller 500 may operate the powered height adjuster concurrently with the powered depth adjuster to change the horizontal depth position of the tabletop with respect to the user's position while changing the height of the tabletop assembly between a first height and a second height. In at least one embodiment, controller 500 may operate the powered depth adjuster to adjust the horizontal position of the tabletop to correspond with the user's hand position (e.g. while the user's elbows are flexed at 90 degrees and the user's arms are hanging relaxed from the shoulders) corresponding to the height of the tabletop assembly.

In at least one embodiment, controller 500 may occasionally operate the powered depth adjuster and the powered height adjuster at coordinated speeds to cause joint movement and stretching. For example, while operating the powered height adjuster to raise the tabletop, controller 500 may operate the powered depth adjuster to move the tabletop inwardly and outwardly at an increased speed to cause forward flexion of a user's trunk and hips as they follow the tabletop's movements.

Figure 19:
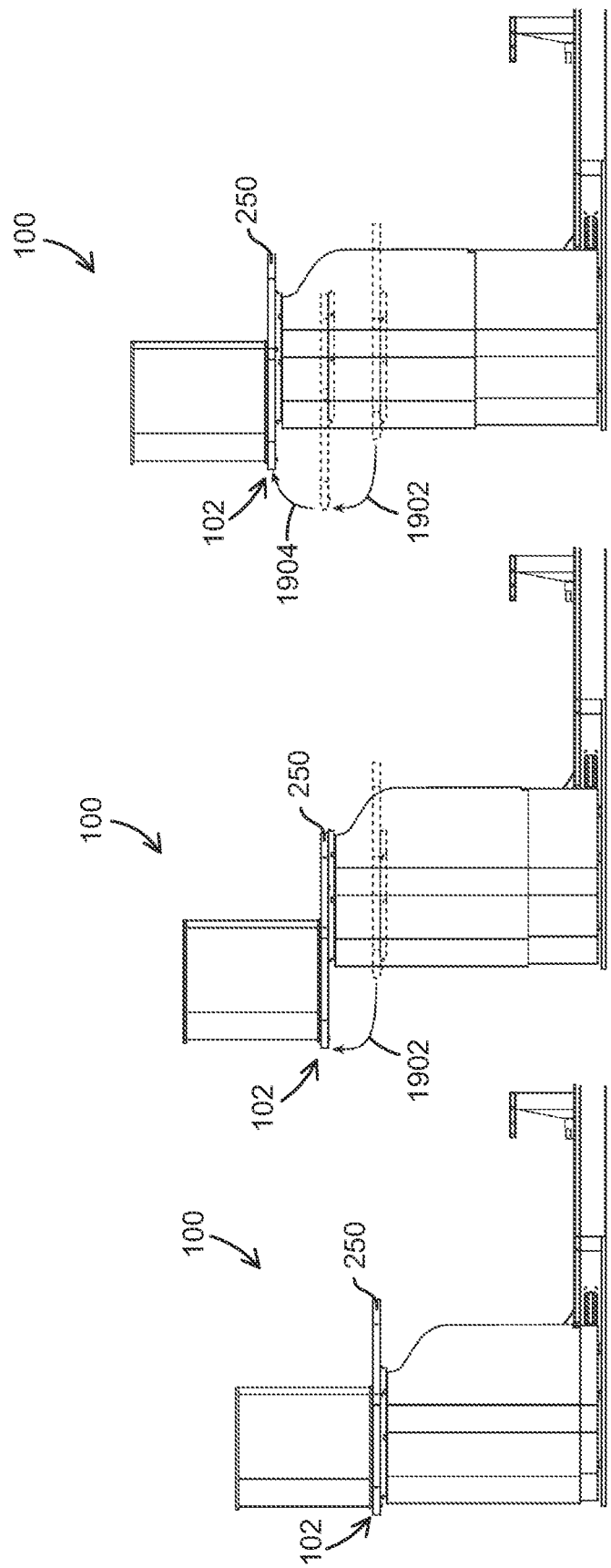
FIGS. 19A-19C show the workstation of FIG. 1 with a tabletop assembly transitioning from a first height to a second height.

For example, FIGS. 19A, 19B and 19C show tabletop assembly 102 as it is raised from a seated height to a standing height. Although FIGS. 19A, 19B, and 19C are described with reference to workstation 100, the described movement pattern is equally applicable to workstation 2000 and other workstation embodiments. In the example shown, tabletop 250 is moved horizontally in a first direction (i.e. left in the figure or away from a user position) between FIGS. 19A and 19B, and then horizontally in a second direction opposite the first direction (i.e. right in the figure or toward the user position) between FIGS. 19B and 19C as the tabletop 250 is raised. In the example shown, the movement pattern generally corresponds to an arc having a "C" shape (as illustrated by arrows 1902 and 1904). This may complement the natural standing movements of a user, which may include (i) leaning the torso forward to transfer weight to above the feet, and then (ii) extending the spine backward to align the spine vertically above the feet and maintain the center of gravity over the feet for balance.

In at least one embodiment, a tabletop may have the same horizontal position when at a standing height and when at a seated height. However, in alternative embodiments (as shown in FIGS. 19A-19C), a tabletop may be adjusted horizontally further away from a user position when at a standing height. In some cases, a further horizontal position may better correspond to the user's hand position when the user is standing with their elbows at 90 degrees and arms hanging relaxed at the shoulders. Generally, the difference between the horizontal position at the seated height and the horizontal position at the standing height may be approximately equal to the length of a user's femur.

A vertical movement pattern including concurrent height and depth adjustment that complements a user's natural movement from sitting to standing (and vice versa) may reduce the disruption to a user in concentrating or doing their work as the height position changes.

In some embodiments, controller 500 may operate the powered height adjuster concurrently with the powered depth adjuster to move the tabletop continuously in a first direction while changing the height of the tabletop assembly between a first height and a second height. In effect, this may produce a diagonal line pattern, as opposed to the "C" shaped pattern described above. In at least one embodiment, this may cause a user's arm to move in the saggital (front-back) plane, moving an otherwise static shoulder posture.

At 1808, controller 500 determines whether a temporary stop is manually or automatically requested. For example, an example of a manual temporary stop may be when controller 500 detects an input from a button or other element on the user interface 516 requesting a temporary stop. In some embodiments, a manual temporary stop may be requested where a user may require fine motor skills (e.g. permanently marking an original copy of a document) or where a user wishes to step away from the workstation briefly (e.g. to use the washroom). In some embodiments, manual temporary stops may not be permitted, and therefore, controller 500 may not determine whether a manual temporary stop is requested.

If controller 500 determines a temporary stop has been requested, then controller 500 temporarily stops the operational routine at 1810. In some embodiments, controller 500 may resume the operational routine of the workstation at 1812 after a predetermined delay. For example, controller 500 may resume the operational routine of the workstation at 1812, after between 1 and 30 minutes. This may encourage users to continue the operational routine of the workstation. This may also make it inconvenient for users to permanently halt the movements of the workstation. It may be in the best interests of a user's health to continue with the routine, even if they do not personally enjoy it. In an alternative embodiment, the operational routine of the workstation is resumed after a command is received from the user (e.g. a "resume" button is pressed).

If a temporary stop is not requested at 1808, then the method 1800 may proceed to 1814. At 1814, controller 500 determines a termination condition. For example, controller 500 may detect an input from a button or other element of the user interface 516 requesting an end to the routine. In another example, controller 500 may detect that the current time corresponds to the end of the user's working hours. In another example, controller 500 may detect the withdrawal of a user memory device. In another example, controller 500 may detect a potentially unsafe situation (e.g. resistance to movement which may indicate something is caught between moving parts). These are all examples of termination conditions.

If controller 500 determines a termination condition, then controller 500 may reset the workstation to a default configuration. For example, controller 500 may operate the powered rotator, powered height adjuster and powered depth adjuster to move or rotate to a default rotational position along the arcuate path, to move the tabletop assembly to a default height and to move the tabletop to a default horizontal depth position.

After returning the workstation to a default configuration, controller may monitor for a new user at 1802.

At least some of the elements of controller 500 that are implemented via software as well as control module 534 may be written in a high-level procedural language such as object oriented programming or a scripting language. Accordingly, the program code may be written in C, C++, or any other suitable programming language and may comprise modules or classes, as is known to those skilled in object oriented programming. Alternatively, or in addition thereto, at least some of the elements of controller 500 that are implemented via software as well as control module 534 may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

Furthermore, at least some of the methods described herein are capable of being distributed in a computer program product comprising a computer readable medium that bears computer usable instructions for one or more processors. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

It should also be noted that "non-transitory" computer-readable media comprise all computer-readable media, with the sole exception being a transitory, propagating signal and therefore the term "non-transitory" is not intended to exclude computer readable media such as a volatile memory or RAM, where the data stored thereon is only temporarily stored, or stored in a "transitory" fashion.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein.

The invention claimed is:

1. A workstation comprising:
   a tabletop:
   a frame;
   a support coupled to the tabletop and the frame for supporting the tabletop vertically above the frame, and
   a powered rotator coupled to the frame, the powered rotator driving the support and the tabletop to move horizontally along an arcuate path relative to the frame,
   wherein a center of curvature of the arcuate path is disposed away from a forward edge of the tabletop.

2. The workstation of claim 1, further comprising:
   a cable management system comprising a first cable conduit extending between a first position on the frame, and a second position proximate the powered rotator,
   a path length of the first cable conduit being at least a distance between the first position and a third position along the arcuate path that is farthest from the first position.

3. The workstation of claim 2, wherein:

the first cable conduit is flexible and configured to form an auxiliary loop when the powered rotator is at a fourth position along the arcuate path that is closer to the first position than the distance between the first position and the third position.

4. The workstation of claim 2, wherein:

the support comprises a powered height adjuster for adjusting a vertical height of the tabletop; and the cable management system further comprises a second cable conduit coupled to the first cable conduit at the second position, and the tabletop, a path length of the second cable conduit being at least a distance between the second position and the tabletop when the powered height adjuster adjusts the vertical height of the tabletop to a maximum height.

5. The workstation of claim 4, wherein:

the second cable conduit is flexible and slack in the second cable conduit forms an auxiliary loop when the powered height adjuster adjusts the vertical height of the tabletop to a second height less than the maximum height.

6. The workstation of claim 5, wherein:

at least one of the first cable conduit and the second cable conduit comprises a chain of pivotally connected conduit links.

7. The workstation of claim 1, wherein:

the frame further comprises a guide rail defining the arcuate path, and the powered rotator is coupled to the guide rail and configured to move along the guide rail.

8. The workstation of claim 7, wherein:

the powered rotator is coupled to the guide rail by a plurality of rollers.

9. The workstation of claim 8, wherein:

the plurality of rollers make rolling contact with a plurality of faces of the guide rail.

10. The workstation of claim 7, wherein:

the powered rotator further comprises a drive assembly, the frame further comprises a drive belt extending through the drive assembly, and the drive assembly acts upon the drive belt to move the powered rotator along the guide rail.

11. The workstation of claim 10, wherein:

the powered rotator further comprises a gear that engages the drive belt, and a motor drivingly coupled to the gear, and when the motor rotates the gear, the gear applies a tensile force to the drive belt thereby urging the powered rotator to move along the guide rail.

12. The workstation of claim 11, wherein:

the drive belt has a surface profile that meshes with teeth of the gear.

13. The workstation of claim 11, wherein:

the powered rotator further comprises first and second guide rollers, and the drive belt extends between the first guide roller and the gear, and extends between the second guide roller and the gear.

14. The workstation of claim 1, wherein:

the support comprises a powered height adjuster for adjusting a vertical height of the tabletop.

15. The workstation of claim 14, further comprising:

a powered depth adjuster for adjusting a distance between the forward edge of the tabletop and the user position.

16. The workstation of claim 15, wherein:

the powered depth adjuster is operable to move the tabletop horizontally in a direction generally perpendicular to the arcuate path.

17. The workstation of claim 15, wherein the powered rotator, the powered height adjuster and the powered depth adjuster are operable concurrently to move the tabletop in three dimensions at the same time.

18. A method of moving a tabletop of a workstation in one or more dimensions, the workstation including one or more actuators coupled to the tabletop, the method being performed by a controller that is configured to send control signals to the one or more actuators to move the tabletop, the method comprising:

determining an angular range and speed of motion based on a user profile for a user of the workstation; and moving the tabletop automatically horizontally, by the one or more actuators, at the speed of motion along. an arcuate path extending across the angular range of motion with respect to a support structure of the workstation.

19. The method of claim 18, further comprising moving the tabletop, by the one or more actuators, automatically and concurrently between a first height and a second height.

20. The method of dam 18, further comprising moving the tabletop, by the one or more actuators, automatically and concurrently horizontally linearly.

* * * * *